April 19, 1966 W. ANGST ET AL 3,247,518

STYLUS FOR DATA PROJECTOR

Filed June 18, 1965 8 Sheets-Sheet 1

INVENTORS
WALTER ANGST
JOSEF VON RANSON
BY JOSEPH G. KENNEDY

OSTROLENK, FABER, GERB & SOFFEN
ATTORNEYS

April 19, 1966 W. ANGST ET AL 3,247,518

STYLUS FOR DATA PROJECTOR

Filed June 18, 1965 8 Sheets-Sheet 3

INVENTORS
WALTER ANGST
BY JOSEF VON RANSON
JOSEPH G. KENNEDY

OSTROLENK, FABER, GERB & SOFFEN
ATTORNEYS

INVENTORS
WALTER ANGST
JOSEF VON RANSON
JOSEPH G. KENNEDY
BY
OSTROLENK, FABER, GERB & SOFFEN
ATTORNEYS

STYLUS FOR DATA PROJECTOR

INVENTORS
WALTER ANGST
JOSEF VON RANSON
JOSEPH G. KENNEDY
BY
OSTROLENK, FABER, GERB & SOFFEN
ATTORNEYS

INVENTORS
WALTER ANGST
JOSEF VON RANSON
BY JOSEPH G. KENNEDY
OSTROLENK, FABER, GERB & SOFFEN
ATTORNEYS

STYLUS FOR DATA PROJECTOR

INVENTORS
WALTER ANGST
JOSEF VON RANSON
JOSEPH G. KENNEDY
BY
OSTROLENK, FABER, GERB & SOFFEN
ATTORNEYS

United States Patent Office 3,247,518
Patented Apr. 19, 1966

3,247,518

STYLUS FOR DATA PROJECTOR

Walter Angst, Douglaston, N.Y., Josef Von Ranson, New Milford, Conn., and Joseph G. Kennedy, Plandome, N.Y., assignors to Kollsman Instrument Corporation, Elmhurst, N.Y., a corporation of New York Filed June 18, 1965, Ser. No. 465,070
14 Claims. (Cl. 346—77)

This invention relates to a projector system and more particularly to a projector system for simultaneously displaying and plotting data wherein the plotting subsystem responds rapidly and accurately to input data while avoiding the need for gearing or worm drive control means and wherein the projection system produces a visual display of high resolution with high speed automatic slide changing ability. The instant application is a continuation-in-part of application Serial No. 195,871, filed May 18, 1962, now abandoned, entitled Data Projector Stylus Assembly and assigned to the assignee of the instant invention.

Graphic representations developed for the purposes of analyzing data find large every day use in scientific business and military applications to name just a few. Graphic representations for analysis purposes may be prepared in a variety of different ways. In order, however, to provide observation of the graphic plot concurrently with the plotting operation the most advantageous system has been found to be a combined electro-optical arrangement.

Having now determined that a combined electro-optical arrangement should be employed in the plotting operation, the basic problem is to determine what type of electro-optical arrangement should be employed which will enable the superimposition of graphic images upon one another by a plurality of such electro-optical devices. In the normal projector systems presently in use, images are projected by imposing opaque objects in front of an illuminating source so that the image takes the form of a dark object upon an illuminated screen (i.e., a dark line on a white background). This presents the problem of destruction of the image from one projector by the light source of another projector, thereby destroying the clarity of the superimposed images.

In order to overcome this disadvantage, it has been decided that the projection device be adapted to project a light image upon a dark screen (i.e., a line of light on a dark background), which arrangement advantageously lends itself to super-imposition of images from a plurality of projectors upon a single screen. Thus, the arrangement decided upon which is embodied in the instant invention consists of an opaque coating and an associated scribing stylus wherein the stylus experiences translational motion under control of electrical input signals for the purpose of scribing (or removing) the opaque coating of a transparent surface. The term "scribing stylus" employed herein is hereinafter intended to mean for the removing (or scratching) of the opaque coating from a transparent substrate whereas the term "writing stylus" is hereinafter intended to mean the act of writing upon a surface such as writing with ink upon a writing surface (i.e., paper). The portion of the opaque coating which has been grooved by the stylus is simultaneously optically projected upon a screen wherein the observation of the projected image takes place concurrently with the operation of the scribing stylus.

Operation of the stylus is performed in instruments of this nature presently in use by controlling the two dimensional movement of the stylus by means of voltage responsive motors which move the stylus by means of precision gearing mechanisms wherein a first motor and gear arrangement drives the stylus in the horizontal direction and a second motor and gear arrangement drives the stylus in the vertical direction whereby the distance which the stylus is driven is determined by the magnitude of the input signals to the voltage responsive motors.

In order that the graph being developed may be observed continuously throughout the plotting operation the stylus used to generate the graph is secured to a transparent member which does not obstruct the light source employed to project the graphic plot upon a viewing screen.

The accuracy of plotter projector systems of this type is greatly impaired due to the inability of the gearing or worm drives employed in such a system to accurately position the stylus under control of the input signals. This is due to the inherent problems of backlash, hunting and low torque-to-inertia ratio found in such gear connected systems.

The novel plotter projector of the instant invention is so designed to provide accurate high speed graphic plotting with concurrent projection of the plot being generated by the employment of direct drive means which control the stylus motion in response to the voltage input signals. The coating arrangement provides a sharp image of the graph to be projected. This arrangement completely avoids all of the undesirable features inherent in a gear connected system such as those employed in prior art devices.

The device of the instant invention is comprised of a transparent stylus mounting which is moved in a vertical plane by means of a direct stylus drive which is operatively connected to the stylus mounting means by means of a shaft driven tape assembly. Transducer means for measuring the stylus horizontal and vertical positions, respectively, are mounted directly to the drive shaft means for providing a precise voltage indication of the stylus position in response to shaft rotation.

The suspension for the stylus mounting frame is a cantilevered spring arrangement which is so designed as to limit the movement of the stylus mounting plate to a single plane without introducing any significant friction or backlash in the positioning operation. A damping means is provided which is adapted to prevent the occurrence of any sustained oscillatory movement of the stylus carriage arrangement. The damping means is sufficiently resilient, however, to have a negligent effect upon the servo drive means which urge the stylus through the plane of motion.

The stylus mounting is comprised of a frame and means for substantially rigidly mounting a stylus to the frame. The resilient mount is provided to separate the large mass of the frame and its activating solenoid from the impacting mass of the stylus and to provide the necessary stylus pressure when the stylus is in the scribing position. The solenoid means initiates stylus engagement by overcoming a resilient hinge arrangemnt to displace the stylus frame.

One alternative embodiment for the stylus mounting means of the instant invention is comprised of a stylus mounting frame which is hinged in the same manner as previously described and which substitutes a crossed-wire supporting structure for the transparent mounting members. A first pair of wires are coupled diagonally to the substantially rectangular stylus frame at the respective corners thereof and passed through suitable openings provided in the stylus member which is located at the intersection of the pair of crossed-wires. The wires may be rigidly secured to the stylus member by a soldering operation or any other suitable fastening means. A second pair of crossed-wires is coupled to the stylus mounting frame in substantially the same manner as the first pair of crossed-wires, with the second pair of crossed-wires lying substantially in a plane at a spaced parallel distance from the plane in which the first pair of crossed-wires lie. Additional suitable apertures are provided within the stylus member to receive the second pair of crossed-wires with these apertures lying at a spaced distance from the apertures receiving the first pair of crossed-wires. The second pair of crossed-wires are rigidly secured to the stylus in the same manner as the first pair of crossed-wires. This mounting provides adequate support for the stylus member and allows substantially all of the light to pass through the opening of the frame so as to function in a manner substantially similar to the transparent mounting.

When using this alternative arrangement, it is desirable to prevent the stylus from being deflected away from its normal position to an appreciable degree, which deflection occurs when the stylus member is brought into contact with the opaque coating composition provided on the annular slide member. A substantial decrease of this deflection angle is achieved by looping the first pair of crossed hair wires over the second pair of crossed hair wires, thereby greatly improving the rigidity of the mounting and reducing the deflection angle which the stylus member experiences by as much as 85% of the deflection experienced by the stylus in the case where the crossed hair wires are not so looped. It is also possible to provide a similar strengthening effect by pinching the wires of the first and second pair of crossed-wires together and soldering these wires or binding the wires with a small length of additional wire to yield the same effect as the looping of said wires.

The opaque slide has an annular configuration the dimensions of which permit a plurality of separate scribes or plot to be scribed upon the slide.

The glass slide is treated with an opaque slide coating composition which provides better line definition, less stylus wear and freedom from skip. The annular slide is rotated by means of a servo operated turret mechanism which includes an indexing means for positioning the slides at predetermined angular positions. A second independently operated disc is provided with a variety of colored filters which serve to identify the plot portrayed by the projection means. The projection system includes a lens arrangement which is electromechanically positioned to correct for trapezoidal effects and for equalizing final image sizes of a plurality of projector systems which include a bank of a plurality of projectors concurrently portraying plots upon a screen. A blower is arranged to cool the projector elements and to remove the opaque coating residue produced during the scribing operation.

One of the opaque coatings employed in prior art devices consisted of a coating material of carbon black which is impressed in any well known manner upon a transparent substrate (i.e., glass). This was found to be highly impractical because lines scribed therethrough became jagged. This necessitates the employment of a protective lacquer which combination requires a large amount of power for driving the scribing stylus drive means.

This led to the development of the coating arrangement of the instant invention which is so adapted as to provide: a coating which is opaque and is easily removable by the stylus; requires substantially less power for the scribing operation in order to drive the scribe stylus; does not chip; is extremely thin; does not cause measurable stylus wear; and is relatively inexpensive in its manufacture.

The structure of the opaque slide consists of a glass (or equivalent) member which is employed for its advantageous features of transparency; hardness; optical flatness; and capability of being readily and simply coated. The coating arrangement consists of a first layer of a soft material which lends itself readily to a scribing operation; for removing the soft material from the substrate; a second layer which provides the necessary opaqueness and a third layer which acts as protective coating for the preventing of chemical and other harmful reactions.

The stylus driving means consists of a servo assembly responsive to a D.C. potential input. The output of the potentiometer transducer means which measures stylus position is compared with the input potential to accurately position the stylus. The resulting error voltage is chopped by an A.C. modulating means which serves to amplify the error voltage to a sufficient output level to drive the servo motor. This arrangement eliminates drift characteristics which are inherent in high gain D.C. amplifiers employed in prior art devices.

The turret containing the slide includes synchro generator means for sensing the turret angular position the output of which is employed to drive the turret motor. Detent means are also provided for accurately positioning the turret during the period in which the stylus is performing the scribing operation. The detent means is automatically disengaged during turret motion. The novel amplifying means employed to power the stylus driving means is multiplexed between the turret servo and the stylus position servo since the operation of the two servos cannot occur simultaneously. A push-button operated stepping switch is employed to control the turret servo and further to prevent the operation of the scribing solenoid means to prevent occurrence of the scribing operation during the time in which the opaque slide is being moved to a new position.

The projector system is adapted for direct connection with the output of any digital encoding means such as a digital computer. This direct connection is facilitated by the digital to analog converter means which converts the digital information taken from the computer output into a D.C. voltage level which is impressed upon the stylus positioning servos. The analog to digital converter employs a conversion network which permits the use of impedance means while at the same time providing an impedance arrangement which operates with minimum error and high switching accuracy.

A manually operable plotting means is provided which is designed to enable an operator to produce a plot with a specially designed writing stylus which generates binary coded decimal signals representative of the graph coordinates concurrently with the manual positioning of the writing stylus.

The manually operating plotting board which converts the manual plot into binary coded characters which are representative of the instantaneous coordinates of the graphic plot provides the input for the digital to analog converter means. The coordinates which are derived through the plotting system are also available for employment in a digital computer simultaneously with the impression of these binary coded coordinate values upon the stylus drive servos.

The manual plotting system is comprised of a plotting board having a matrix of insulated conductors which are pulsed in a sequential fashion. A stylus transducer which is contained in the plotting system writing stylus senses the presence of the pulses in the conductors nearest the transducer. The pulses are compared with a time reference which is representative of the conductors' coordinate position producing a binary coded output which is a measure of the writing stylus coordinate. This function is performed for both coordinate axes which causes the writing stylus to be uniquely located within the dimensions of the plotting board. The transducer within the writing stylus is designed to be sensitive to input pulse energy over an extremely small area of the board so as to produce highly accurate coordinate measurements.

The writing stylus serves the dual function of acting as the pulse sensing transducer and as a conventional pen which has the capability to produce a graphic plot upon a plotting board translucent overlay which enables the operator to continuously view the information during the writing period. The stylus writing fluid may, however, be of a non-smearing solvent erase type wherein the writing may be imprinted directly on and likewise erased directly from the plotting board surface. A coordinate grid is engraved in the writing board surface, which grid may be seen through translucent or transparent paper to facilitate the manual plotting by the operator. The plastic writing board has edge lighting means for operation in low ambient light levels.

The writing stylus is so designed as to pick up the pulses generated in the writing board conductor matrix regardless of the angular position of the writing stylus with respect to its longitudinal axis. Since the pulses for the X and Y coordinates of the conductor matrix do not occur concurrently only one pulse sensitive transducer need be employed in the stylus.

A rear projection system is employed for the portrayal of the graphic plots so as to avoid obscuring any of the projected plots to operators positioned behind the bank of projectors. The screen is formed of a special material which produces optimum diffusion of the image without undue light loss due to scattering.

It is therefore one object of this invention to provide a novel data projection system having a stylus suspension which limits movement of the stylus to a single plane without introducing any significant friction or backlash.

Another object of this invention is to provide a novel data projection system having a direct drive means for accurately positioning the scribing stylus while avoiding the introduction of backlash and hunting.

Still another object of the invention is to provide a novel servo arrangement in a data projection system which is so designed as to modulate the error signal prior to amplification thereof in order to eliminate undesirable amplifier drift characteristics.

Another object of the invention is to provide a data projection system having a novel means for concurrently producing a graphic plot and binary coded characters of the instantaneous coordinates of the graphic plot for controlling the projection system scribing stylus.

Another object of the instant invention is to provide a data projection system having novel means for concurrently producing a graphic plot and binary coded characters of the instantaneous coordinates of the graphic plot for controlling the projection system scribing stylus.

Another object of the invention is to provide a data projection system having a novel scribing stylus mounting means having a small inertia characteristic and which is also able to withstand the stylus impact which occurs in the scribing mode.

Another object of the invention is to provide a data projection system having novel means for rapidly changing the projection system opaque slides.

Still another object of this invention is to provide a slide changing mechanism and direct drive mechanisms for positioning the scribing stylus wherein the turret and direct drive mechanisms employ a single amplifier means which is multiplexed on a time sharing basis by all of said drive means.

Another object of this invention is to provide a data projection system having direct tape drive means for positioning the scribing stylus wherein the follow-up transducer is directly connected to the stylus drive means for providing a precise indication of the scribing stylus position.

Another object of this invention is to provide a data projection system having novel means for damping oscillatory vibrations of the stylus carriage system.

Another object of the instant invention is to provide a novel stylus mounting frame for use in data projectors and the like, which mounting is comprised of a stylus mounting frame having first and second transparent members secured thereto with the stylus member being secured near the center of said first and second transparent members.

Another object of the instant invention is to provide a novel stylus mounting frame and first and second pairs of crossed-wires secured to said stylus mounting frame with the stylus member being secured at the intersections of said first and second pairs of crossed-wires.

Another object of the instant invention is to provide a novel stylus mounting frame and first and second pairs of crossed-wires secured to said stylus mounting frame with the stylus member being secured at the intersections of said first and second pairs of crossed-wires and wherein associated wires of said first and second pairs of crossed-wires are secured to one another to greatly reduce the deflection of said stylus member as it comes in to engagement with the opaque coated annular slide member.

These and other objects of this invention will become apparent in considering the following description and accompanying drawings in which.

FIGURES *9a* and *9b* are top views of a portion of the stylus carriage assembly showing the stylus position in the normal undeflected and the displaced positions, respectively.

Figures 9A, 10:
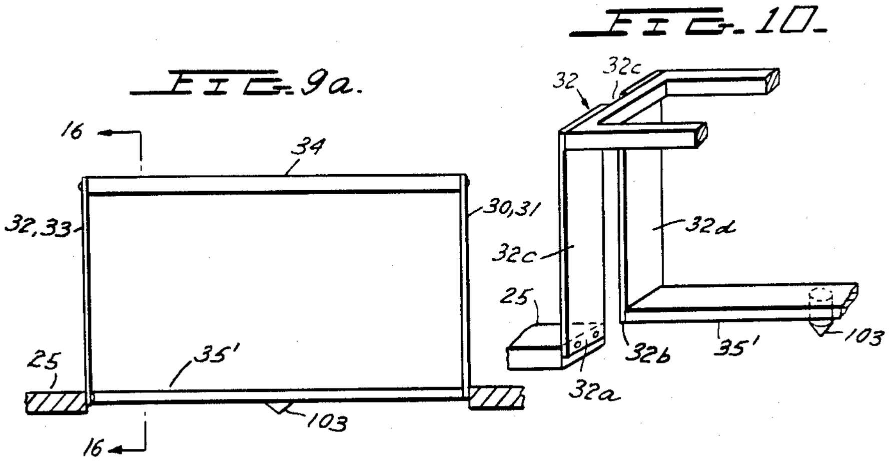

FIGURE 10 is an oblique view taken along line 16—16′ of FIGURE *9a*.

Figure 11:
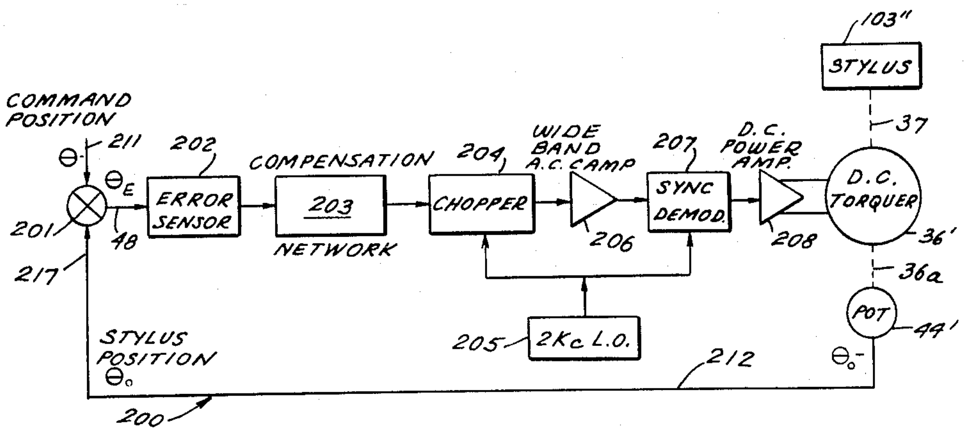

FIGURE 11 is a block diagram of the servo mechanism assembly employed for positioning the stylus along one axis.

Figure 12:
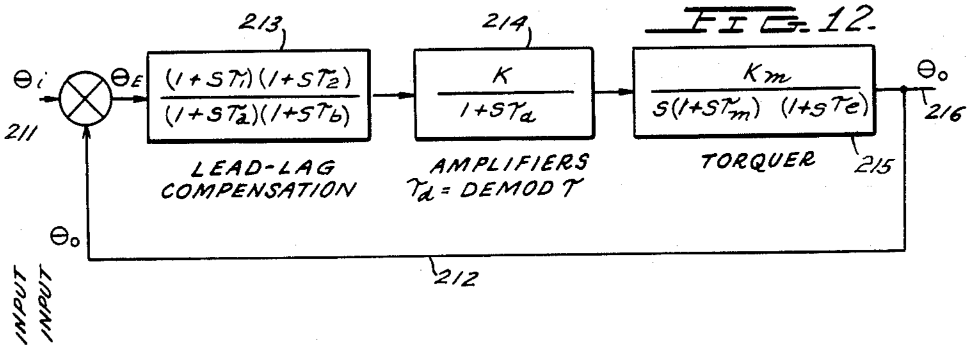

FIGURE 12 is a block diagram of the servo system of FIGURE 11 showing the transfer functions of the servo mechanism assembly.

Figures 3, 4, 16, 18:
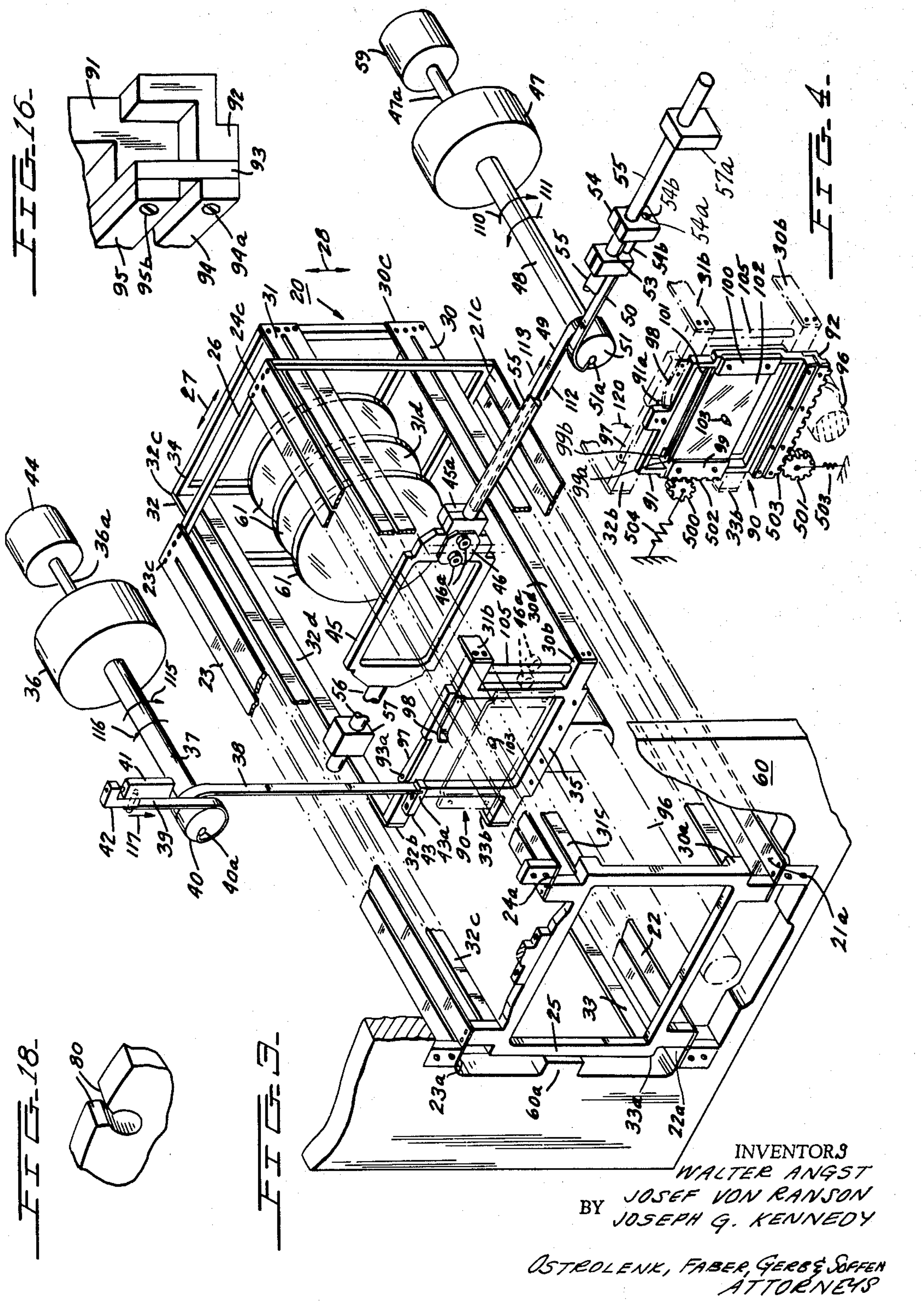
FIGURE 3 is a perspective view showing the novel carriage suspension means shown in FIGURE 2 in greater detail.
FIGURE 4 is a perspective of the scribing stylus sub-assembly showing the stylus sub-assembly of FIGURE 3 in greater detail.
Figure 13:
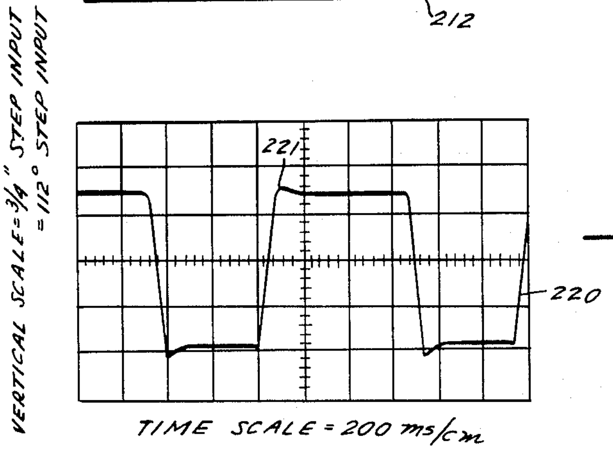

FIGURE 13 is a diagram showing the waveform of the response of the servo mechanism assembly of FIGURE 18 to three step inputs.

Figures 1, 21A, 21B:
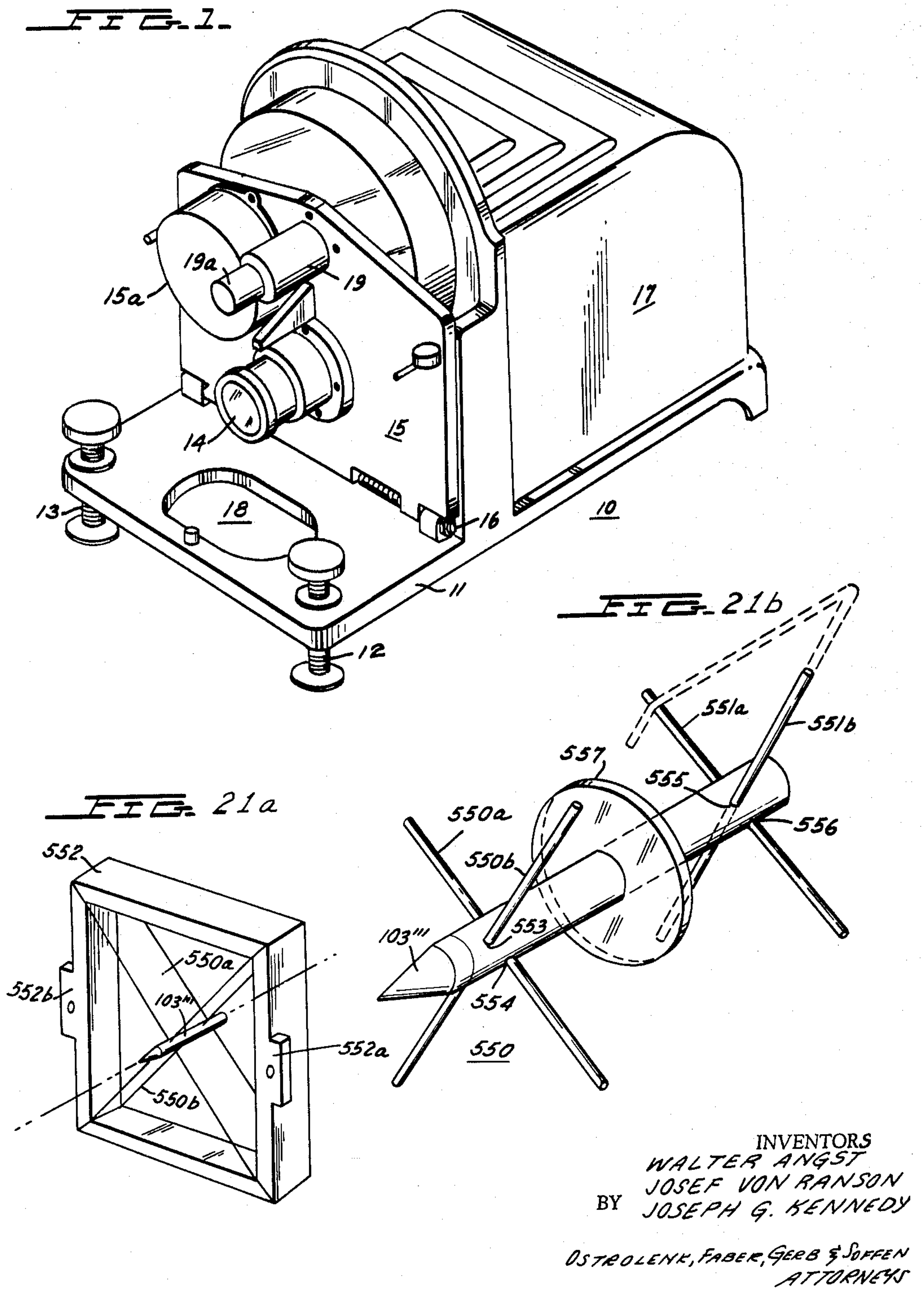
FIGURE 1 is a perspective view of the plotting projector assembly of the novel data projection system.
Figures 14, 15:
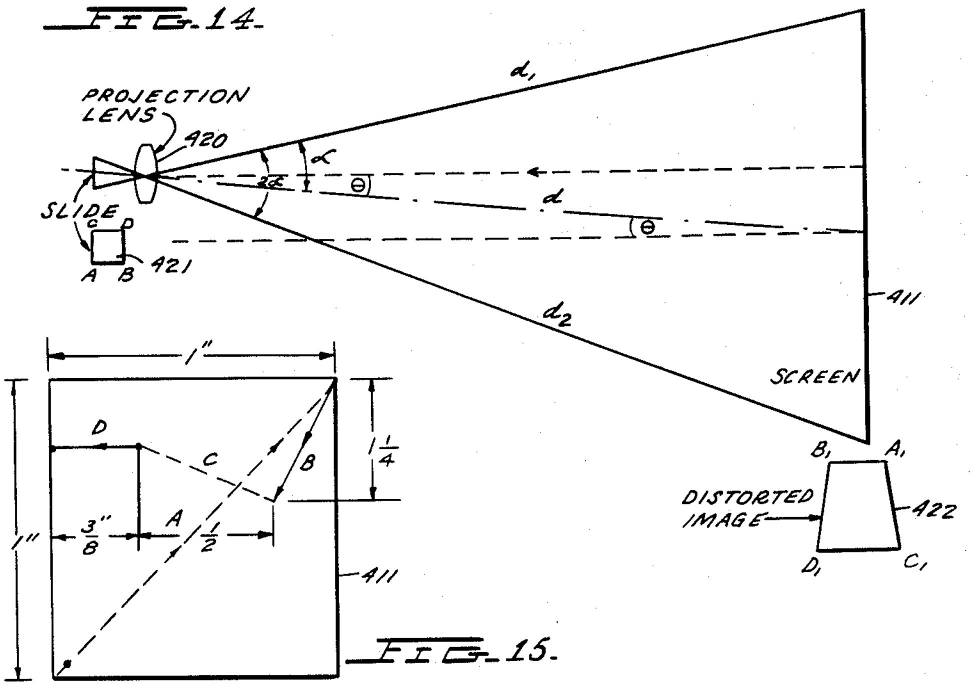

FIGURE 14 is a schematic diagram of trapezoidal distortion occurring in the projection of a plot by the projector of FIGURE 1.

FIGURE 15 is a schematic showing a typical project or problem which is employed in analyzing the operation of the novel data projection system.

Figures 2, 5, 6:
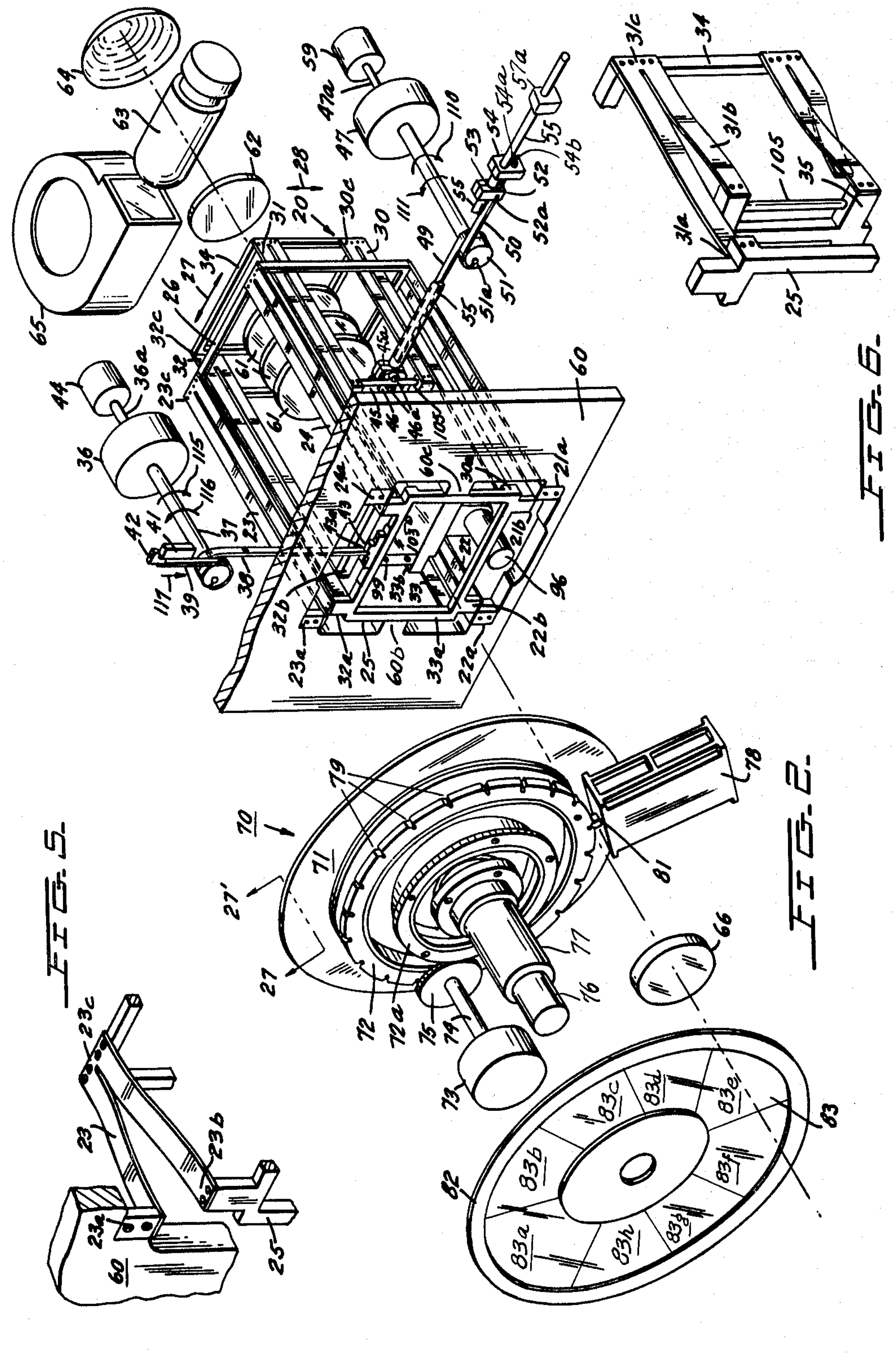
FIGURE 2 is an exploded view showing the components housed in the projector assembly of FIGURE 1.
FIGURES 5 and 6 are perspective views of the vertical and horizontal suspension portions, respectively, of the suspension system shown in FIGURES 3 and 4.

FIGURE 16 is a perspective view of a portion of the stylus holding plate assembly shown in FIGURE 2 showing the stylus assembly hinge spring in greater detail.

Figures 8, 17, 20:
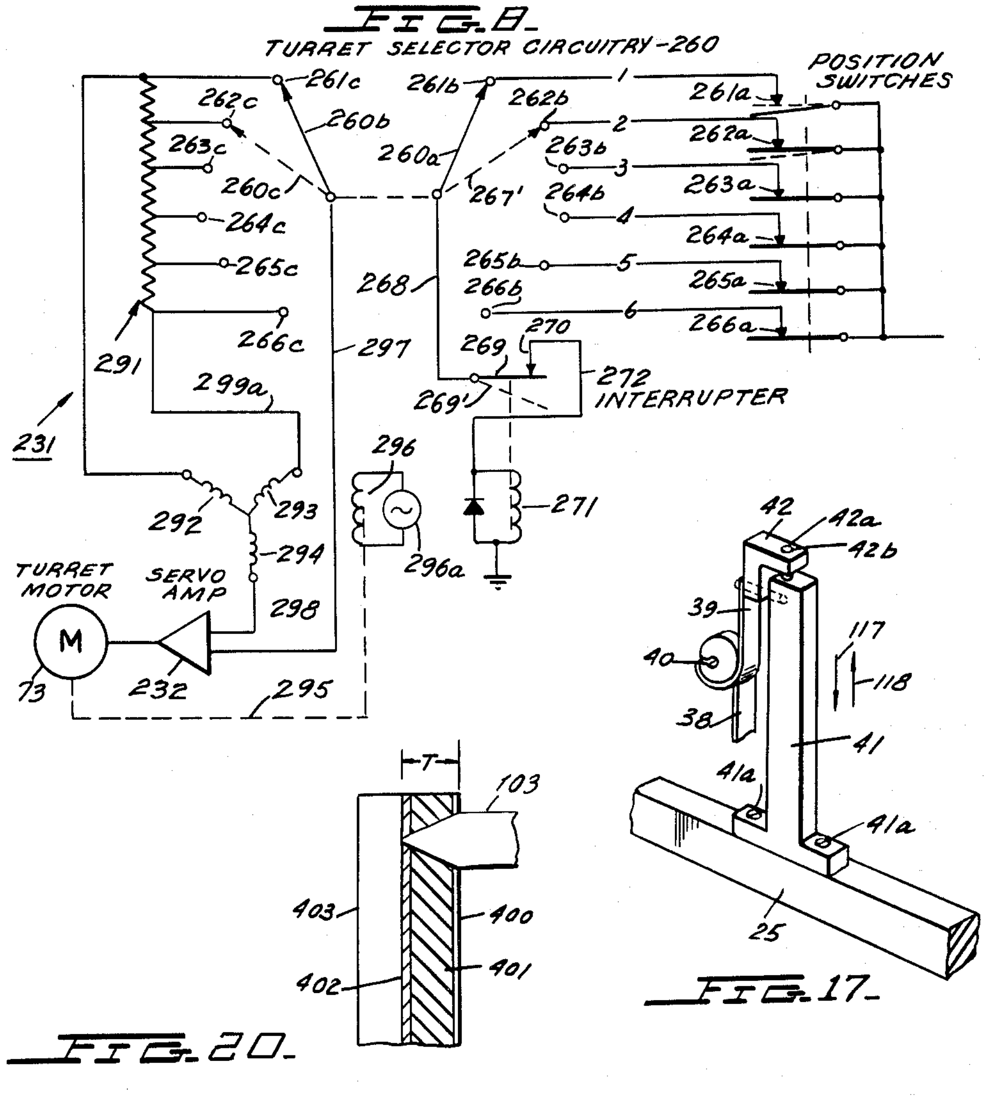
FIGURE 8 is a schematic diagram of the turret selector circuitry for operating the opaque slide turret means.

FIGURE 17 is a perspective view showing a portion of the vertical tape drive assembly of FIGURES 2 and 3 in greater detail.

FIGURE 18 is a close-up view of the turret assembly notched periphery shown in FIGURE 2.

Figure 19:
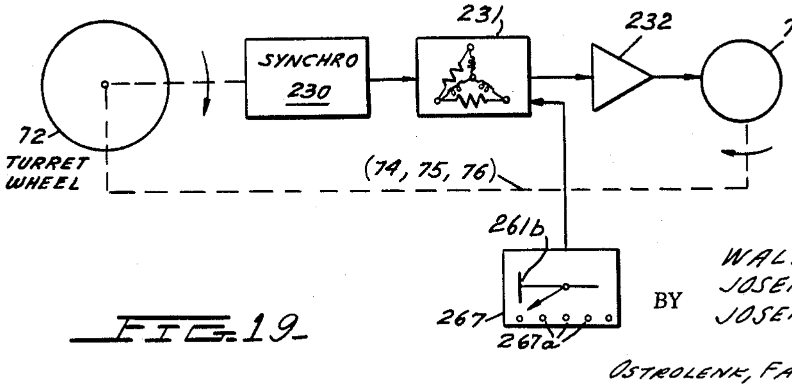

FIGURE 19 is a schematic diagram of the turret positioning synchro assembly.

FIGURE 20 is a cross-sectional view of the opaque slide taken along line 27—27′ of FIGURE 2.

FIGURE 21*a* is a perspective view of a preferred embodiment of the scribing stylus mounting means.

FIGURE 21*b* is an enlarged perspective view of a portion of the scribing stylus mounting of FIGURE 21*a*.

Figures 22, 22A, 22B, 22C, 22D, 23A, 23B, 24A, 24B:
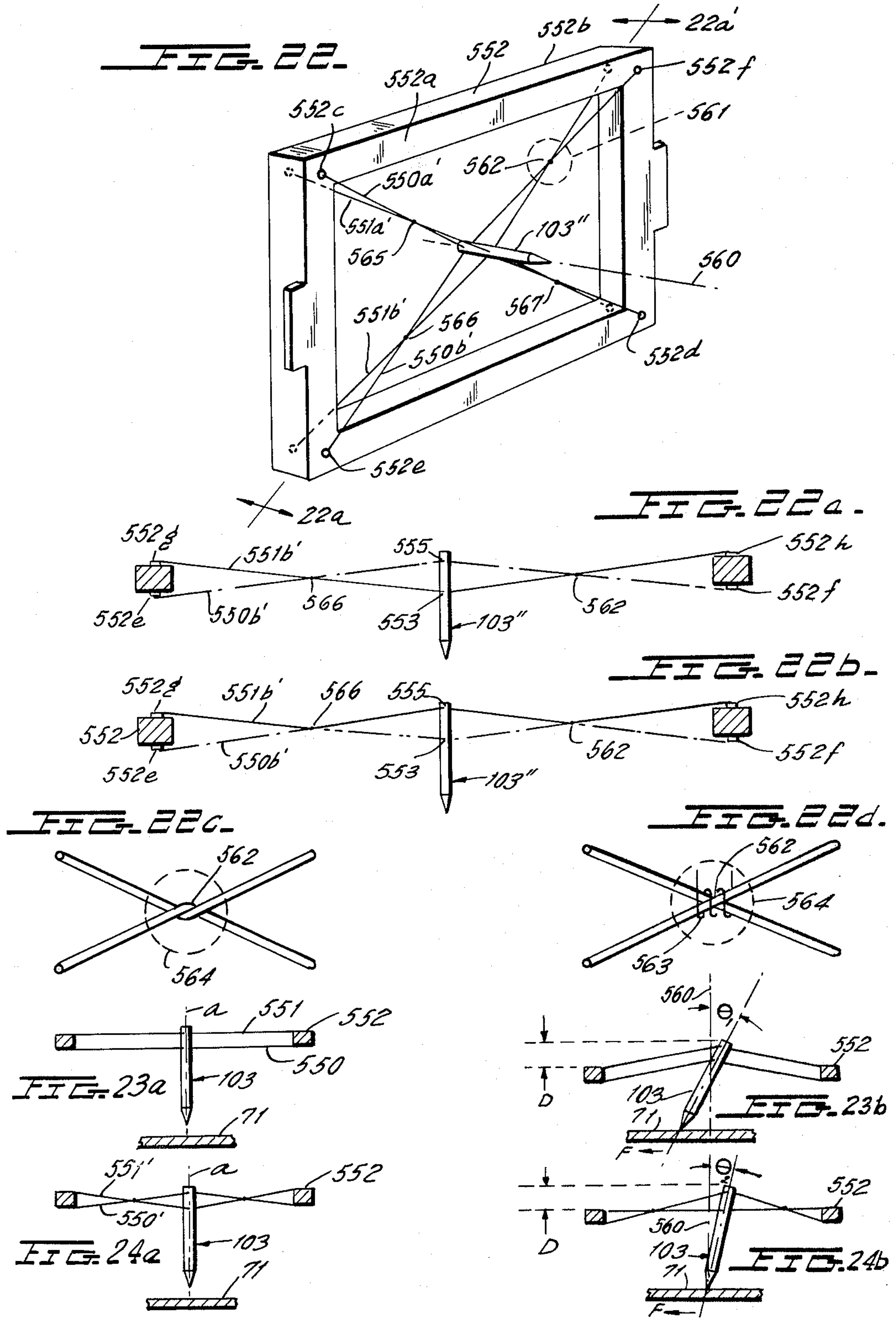

FIGURE 22 is a perspective view of the stylus mounting of FIGURE 21*a* with the crossed-wires being coupled to provide added strength for the stylus member.

FIGURE 22*a* shows a cross-sectional view of the stylus mount of FIGURE 22 taken along the line 22*a*—22*a'*.

FIGURE 22*b* shows a cross-sectional view of the stylus mount similar to the view of FIGURE 22*a* with the crossed-wires being looped.

FIGURE 22*c* is a perspective view showing the manner in which the crossed-wires are looped, in greater detail.

FIGURE 22*d* is a perspective view showing an alternative manner for looping the crossed-wires of the embodiment of FIGURE 22.

FIGURES 23*a* and 24*a* are sectional views of the stylus assemblies of FIGURES 21*a* and 22, respectively, with the stylii being in the undeflected position.

FIGURES 23*b* and 24*b* are sectional views showing the stylii of FIGURES 23*a* and 24*a*, respectively, in the deflected positions.

Referring now to the drawings, FIGURE 1 shows our novel data projector 10 which is comprised of a base member 11. The rear portion of base 11 has positioned thereupon a housing 17 which houses the stylus and stylus driving means which generates the plot to be projected. A front plate 15 which is pivotally mounted to base 11 by hinge means 16 has mounted thereto a portion 14 of the data projector lens system which is employed to project a sharp image upon the data projector screen (not shown). A pair of adjustable legs, 12 and 13, are mounted through associated tapped holes in base 11 to permit vertical alignment of the plot being projected. The cover plate 15 may be readily opened for the purpose of either inspecting or repairing the data projector interior for corrective or preventive maintenance. An aperture 18 is provided in base member 11 to allow sufficient clearance for lens mount 14 during the opening operation, so as to protect the lens from breakage.

STYLUS CARRIAGE ASSEMBLY

FIGURES 2–6 portray views of the projector 10 shown in FIGURE 1 wherein the elements within the projector housing 17 are shown in an exploded arrangement. The projector scribing stylus 103 (see FIGURES 2 and 3) is resiliently suspended by a carriage assembly 20 which is comprised of a plurality of substantially U-shaped resilient members, 21–24, and 30–33. The first arms of members 21–24 are securely fastened to main plate 60 by means of blocks **21*a*–24*a*. The ends 21*b*–24*b* adjacent the blocks 21*a*–24*a* are secured to outer frame 25 which is positioned in opening 60*a* of main plate 60, which plate has projections 60*b* and 60*c* which cooperate with blocks 21*a*–24*a* secured to main plate 60 to permit vertical movement of outer frame 25 which is confined between projections 60*b* and 60*c*. The opposite ends 21*c*–24*c* of resilient members 21–24, respectively, are securely fastened to outer spring support 26. This portion of the stylus suspension assemblage produces, therefore, a cantilever suspension which is more clearly shown in FIGURE 5 for enabling outer frame 25** when properly driven, to cause deflection of the cantilever suspension arms, which arms are adapted to return to their initial undeflected positions upon removal of the driving force as will be more fully described.

An inner spring support 34 is operatively associated with outer frame 25 by means of U-shaped resilient members 30–33, respectively, which members have a first arm **30*a*–33*a* securely fastened to outer frame 25, while the web portion 30*c*–33*c* of each resilient member 30–33, respectively is securely fastened to inner spring support 34. The remaining arms 30*b*–33*b* of each resilient member 30–33, respectively, are securely fastened to inner frame 35. The arms 30*a*–33*a* are exactly equal in length to their associated arms 30*b*–33*b*, respectively; and the arms 21*a*–24*a* are exactly equal in length to the associated arms 21*b*–24*b*, respectively, in order to insure that outer spring support 26 experiences one-half of the vertical deflection experienced by outer frame 25 and that inner spring support 34 experiences one-half of the horizontal deflection experienced by inner frame 35. While FIGURE 6 may give the impression that arm 31*a* is not equal to arm 31*b***, in actuality the arms are substantially equal.

A shaft 105 is positioned on the right-hand side of inner frame 35, which shaft physically links inner frame 35 to cross-feed frame 45 by means of bearing block 46 and fasteners **46*a*. Cross-feed frame 45 imparts horizontal movement to inner frame 35 for the purpose of moving the scribing stylus in a manner to be more fully described. The manner in which the shaft 105 is physically linked to the cross-feed frame 45 can be seen by the phantom representation of shaft 105, adjacent frame 45 in FIGURE 2. It can be seen from this representation that any horizontal movement of cross-feed frame 45 will be imparted to inner frame 35. Cross-feed frame 45 is prevented from any vertical movement, however, as will be more fully set forth, so that any vertical movement which inner frame 35 experiences will not be transmitted to cross-feed frame 45 since shaft 105 is not restrained from undergoing vertical movement within bearing block 46**.

TAPE DRIVE ASSEMBLY

The opposite ends of cross-feed frame 45 are secured to sleeves 55 and 56, respectively, which sleeves are shown partially broken away in order to expose other elements of the data projector interior. Sleeves 55 and 56 are slidably engaged by sleeve retainers 57 and **57*a*, respectively, which sleeve retainers are provided with apertures for receiving the associated sleeves. This sleeve arrangement enables cross-feed frame 45 to experience horizontal movement and to be restrained from any vertical movement. Sleeve retainers 57 and 57*a* are secured to the data projector housing 17 (see FIGURE 1) in any well known manner. A third sleeve retainer 52 has an aperture 53 which receives sleeve 55 for the purpose of securely fastening retainer 52 to sleeve 55. An adjusting screw 54*a* cooperates with aperture 54*b* and tapped aperture 52*b* for the purpose of conveniently tensioning tapes 49 and 50 while member 52 is securely fixed to sleeve 55. Sleeve retainer 54 is securely fastened to sleeve 55 for the purpose of tensioning tapes 49 and 50. Member 54 is first fastened to sleeve 55 then screw 54*a* is tightened to tensioning tapes 49 and 50 after which member 52 is clamped securely to sleeve 55. The limiting stops for the horizontal, as well as the vertical travel of the frame 35, are suitably built into the two torquers 36 and 47, to be more fully described, which limit the rotation of the torquers to slightly more than that which corresponds to one inch of linear travel of the stylus. In this manner no strain is applied to the tapes themselves as they approach the limiting positions. One end of a metal tape 50 is seated in a slit 52*a* of retainer 52 and is securely fastened therein. The opposite end of tape 50 is securely fastened to a pulley 51 by means of an anchor member 51*a***.

A second metal tape 49 is likewise secured to pulley 51 by anchor member **51*a* at a first end while the opposite end of metal tape 49 is securely fastened in a slit (not shown) of block 45*a* which is secured to cross-feed frame 45. Pulley 51 is mounted to drive shaft 48 which is rotatably driven by torquer 47. A potentiometer type transducer 59 is operatively connected to torquer 47 by means of drive shaft 47*a* which transducer member 59, in response to rotation of drive shaft 47*a* (which rotates concurrently with drive shaft 47), provides the error signal for the servo mechanism apparatus (not shown) for rapidly and accurately controlling torquer 47. Torquer 47 is a D.C. motor which rotates drive shaft 48** in response to an input voltage which represents the horizontal or "*x*" coordinate to which the scribing stylus must be driven. The horizontal tape assembly which includes tapes 49 and 50 produce the necessary horizontal movement as will be more fully described.

The vertical movement of the scribing stylus is provided by a vertical tape asembly which is comprised of a tape 38 having its first end seated and securely fastened in slit 43*a* of block 43 which is, in turn, secured to inner frame 35. The opposite end of metal tape 37 is secured to pulley 40 by anchor member 40*a*. Metal tape 39 has a first end secured to pulley 40 by anchor member 40*a* and a second end secured to L-shaped member 42 (note especially FIGURES 2, 3 and 23). L-shaped member 42 has an adjusting screw means 42*a* which is engaged by tapped aperture 42*b*. An elongated member 41 is securely fastened to outer frame 25 by fastening means 41*a* at its first or lower end, while the upper end of member 41 abuts the lower tip (not shown) of adjusting screw 42*a*.

Pulley 40 is mounted to vertical drive shaft 37 which transfers rotational movement of the armature (not shown) of torquer 36 to pulley 40. A second shaft 36*a* connects potentiometer transducer 44 to the armature of torquer 36 for the purpose of developing the error signal to rapidly and accurately positon the armature of torquer 36 in the same manner as described with respect to potentiometer transducer 59 and torquer 47 set forth previously.

The horizontal movement of inner frame 35 takes place as follows:

In response to an electrical input signal torquer 47 rotates horizontal drive shaft 48 in either the clockwise or the counterclockwise direction, as shown by arrows 110 and 111, respectively, depending upon the polarity of the input signal to torquer 47.

Assuming that the polarity of the input signal impressed upon torquer 47 causes torquer 47 to drive shaft 48 in the clockwise direction 110, this causes metallic tape 49 to be drawn in the horizontal direction shown by arrow 113, under control of pulley 51. The movement of metallic tape 49 in the direction of arrow 113 draws cross-feed frame 45 in the same direction. Sleeves 55 and 56 which are secured to the right and left-hand edges of cross-feed frame 45, respectively, are both urged in the direction shown by arrow 113. Metallic tape 50 is kept taut due to the fact that it is firmly secured to sleeve retainer 53, thus causing the metallic tape 50 to remain taut even though it is being unwound from pulley 51.

The bearing block 46, which mechanically links cross-feed frame 45 to inner frame 35, causes the horizontal movement of cross-feed frame 45 to be imparted to inner frame 35 thus moving it to the position shown in FIGURE 6. The resiliency of the cantilever members 30–33, coupled with the means for keeping the metallic tapes 49 and 50 in a taut position serve to cancel all backlash between the drive shaft 48 and the frame 35. FIGURES 15*a* and 16, which are top views of the scribing stylus suspension, show the U-shaped members 30–33 in their normal undeflected position.

For movement of the cross-feed frame 45 in the reverse horizontal direction shown by arrow 112 in FIGURE 3, drive shaft 48 rotates counterclockwise as shown by arrow 111, causing metallic tape 50 to be wound in the counterclockwise direction about pulley 51 thus drawing the right-hand end of metallic tape 50 in the direction shown by arrow 112. The movement of metallic tape 50 is imparted to retainer sleeve 53 which, in turn, imparts the movement to sleeve 55 driving cross-feed frame 45 in the direction shown by arrow 112. Sleeves 55 and 56 act as guiding members to limit any sidewise or vertical movement by cross-feed frame 45. Tape 49 is kept taut due to the fact that it is securely fastened to block 45*a* mounted upon cross-feed frame 45 which keeps metallic tape 49 taut even though it is unravelling from pulley 51.

Figure 9B:
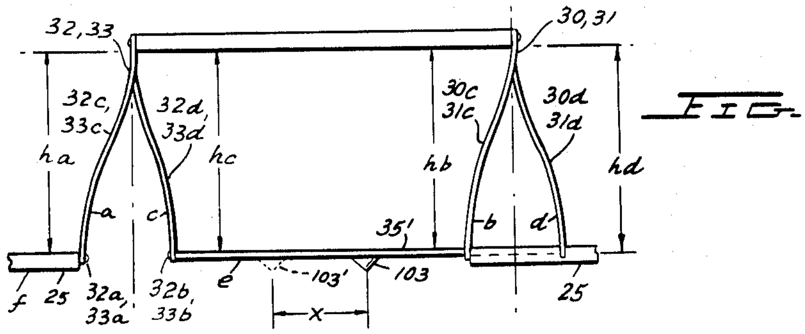

FIGURE 9*b* is a top view of the scribing stylus suspension assembly presently under discussion, wherein member 35′ schematically represents both cross-feed frame 45 and inner frame 35 which has stylus 103 mounted thereto. The stylus 103′ in FIGURE 9 represents the normal or undeflected position of the scribing stylus and the stylus 103 of FIGURE 9 represents the right-hand horizontal movement of the frame 35′ under control torquer 47 shown in FIGURES 2 and 3.

Because the deflection characteristics of all spring arms are identical the distortion described by all four spring arms is identical or sufficiently identical to assure that the following distances are equal; $h_a$ of spring arms 32*c* and 33*c* (see FIGURES 9 and 10);

$h_c$ of spring arms 32*d* and 33*d*;
$h_b$ of spring arms 30*c*, 31*c*;
$h_d$ of spring arms 30*d*, 31*d*.

This assures that the motion of the stylus bearing assembly 35′ as shown in FIGURES 9*a* and 9*b* and 10 and its associated stylus will follow a prescribed straight line, parallel to the rigid projector frame surfaces 25.

It should be noted that horizontal movement of cross-feed frame 45 and inner frame 35 in either horizontal direction is not imparted to outer frame 25 which is linked to inner frame 35 by U-shaped spring members 30–33, since outer frame 25 is prevented from moving in a horizontal movement due to the stiffness against flexing of U-shaped springs 21–24.

Vertical movement of inner frame 35 takes place as follows:

Vertical drive shaft 37 rotates either clockwise or counterclockwise as shown by arrows 115 and 116, respectively, under control of torquer 36 which drives shaft 37 in the appropriate direction depending upon the polarity of the voltage signal pressed upon the torquer 36.

Assuming first that the vertical drive shaft 37 is rotated in the clockwise direction as shown by arrow 115, this causes metallic tape 39 to be wound around pulley 40 thus driving the upper end of metallic tape 39 in the direction shown by arrow 117. This operation can best be seen in FIGURES 2, 3 and 23. The movement of metallic tape 39 in the direction shown by arrow 117 urges L-shaped member 42 which is rigidly affixed to elongated member 41, which in turn is attached to outer frame 25 by fastening means 41*a*, to move outer frame 25 in the direction shown by arrow 117. The spring members 21–24 which are fastened in a cantilever suspension arrangement of the same nature as spring members 30–33, are urged in a deflected position in the same manner as is shown with respect to spring members 30–33 in FIGURES 9*a*, 9*b* and 10. The arms of each spring member 21–24 deflect in the same manner as is shown in FIGURE 9*b*, so as to limit the vertical movement of outer frame 25 to a plane which is parallel to main plate 60, or in other words, preventing outer frame 25 from exhibiting any movement other than that in the upward or downward vertical directions.

The vertical deflection in the direction shown by arrow 117 is transmitted to inner frame 35 in the following manner:

The upper arms 31*d* and 32*d* of spring members 31 and 32, and the lower arms 30*d* and 33*d* of spring members 30 and 33 are secured to frame 25 at ends 30*a*–33*a*, respectively. It can clearly be seen in FIGURES 2 and 3 that spring members 30–33 are aligned perpendicularly to spring members 21–24 so that spring members 30–33 are substantially prevented from experiencing any deflection whatsoever in the vertical direction shown by arrow 117. Thus the vertical movement of outer frame 25 in the downward vertical direction shown by arrow 117 is directly imparted to inner spring support 34 which moves downward in the direction of arrow 117, a distance equal to the deflection which outer frame 25 experiences. The shorter arms 30*e*–33*e* of spring members 30–33, respectively, are securely fastened at their ends 30*a*–33*a* to inner frame 35 which experiences a deflection of the same distance experienced by inner frame 34.

The downward movement of metallic tapes 38 and 39 in the direction of arrow 117 causes outer frame 25 and inner frame 35 to move vertically downward due to the fact that the upper end of metallic tape 39 is securely fastened to extension member 41 of outer frame 25 by means of L-shaped member 42 and the lower end of metallic tape 38 is fastened to outer frame 25 by means of block 43*a* thus, although the clockwise movement of pulley 40, as shown by arrow 15, serves to unravel metallic tape 38 from pulley 40, metallic tapes 38 and 39 remain taut since the same length of tape 39 is wound about pulley 40 as is unwound off tape 38. Therefore, the built-in tension of tapes 38 and 39 is maintained throughout the positioning operation.

No vertical movement whatsoever is experienced by cross-feed frame 45 since bearing block 46 permits shaft 105 of inner frame 35 to slide freely in the upward or downward vertical directions within the confines bearing block 46. It can therefore, be seen that cross-feed frame 45 imparts horizontal movement to inner frame 35 without experiencing any vertical movement due to the bearing block arrangement 46, which acts as a buffer means to prevent vertical movement to cross-feed frame 45 under control of torquer 36.

When torquer 36 (which may be of the same type as torquer 47) drives vertical drive shaft 37 in the counterclockwise direction it causes metallic tape 38 to be reeled in by pulley 40 causing the lower end of metallic tape 38 to move upward in the direction shown by arrow 118 (see FIGURE 17). Due to the perpendicular alignment of spring members 30–33, with respect to spring members 21–24 and the direction of movement shown by arrow 118 all upward vertical movement of inner frame 35 is imparted to inner spring support 34 and, in turn, to outer frame 25 by means of spring arms 30*e*–33*d* and 30*d*–33*d*, respectively. The ultimate upward vertical movement of outer frame 25 in the direction shown by arrow 118 under control of torquer 36 urges elongated member 41, to which L-shaped member 42 is rigidly attached, in the upward direction. Thus, although the counterclockwise movement of pulley 40 causes metallic tape 39 to unwind the initial tension of metalilc tapes 38 and 39 is not lost since an equal length of tape 38 is wound on to pulley 40 as is unwound off tape 39. Thus, it can be seen that the vertical tape assembly and taut drive means eliminates all backlash between torquer 36 and inner frame 35.

SCRIBING STYLUS SUB-ASSEMBLY

The scribing stylus 103 is rigidly mounted between two spaced parallel glass plates 101 and 102. Because the plates are extremely thin they serve as resilient members which act as an impact force controling means. Two glass plates 101 and 102 are employed in order to provide rigid support for the stylus 103 laterally in the X and Y axes while at the same time providing sufficient resiliency in the stylus axis to result in the proper stylus pressure when in the scribing mode. Glass plates 101 and 102 are positioned and secured by vertically aligned members 99 and 100. Member 99 is provided with two vertical slots 99*a* and 99*b* and member 100 is provided with two like vertical slots (not shown) for engaging the left and right-hand edges, respectively, of glass plates 101 and 102. The members 99 and 100 are secured to a frame 91. Plates 101 and 102 are cemented to the grooves in members 99 and 110, respectively, in any well known manner.

The preferred, transparent resilient stylus mounting (see FIGURE 4) has the two parallel transparent resilient members 101, 102 (glass, quartz or plastic) mounted at their periphery to members 99 and 100 secured to frame 91 and being substantially parallel and a predetermined distance apart from each other. The stylus 103, which is fastened to the two transparent resilient members at a point near their centers is of minimum mass. The stylus 103 passes through the members 101 and 102 as shown in FIGURE 4. The stylus 103 is then cemented or secured to the members 101 and 102 in any suitable manner. The thickness of the two transparent resilient members is chosen so that their desired deflection results in the stylus pressure necessary to scribe in the opaque medium. Making the stylus mass and that of the transparent, resilient members a minimum, results in a minimum impact pressure when the stylus is suddenly brought into contact with the slide to be scribed. This impact pressure results from decelerating the mass of the stylus and that part of the transparent, resilient members which move with the stylus.

To insure long stylus life it is important to keep this impact pressure to a minimum and also to make the opaque coating soft, which will require a minimum of scribing pressure on the stylus.

A substantially L-shaped member 92 (see FIGURE 16) is firmly secured to the lower edge of inner frame 35 in any well known manner. A hinge spring 93 is positioned with its lower edge being adjacent the lower edge of substantially elongated L-shaped member 92 and is secured between a plate 94 and member 92 by fastening means 94*a*. The upper half of elongated hinge spring 93 is positioned between the lower edge of frame 91 and elongated plate 95 and is firmly secured to members 91 and 95 by fastening means 95*b*. This arrangement provides a cantilevered suspension for frame lever 91.

The upper portion of frame 91 which is otherwise free to rotate about hinge spring 93 is urged against the face of inner frame 35 by a spring 98 which is secured at a first end to inner frame 35. The opposite end of spring 98 abuts a tubular projection 91*a* on frame 91 urging frame 91 against the adjacent face of inner frame 35. In this position the scribing stylus is approximately 8 to 15 thousands of an inch away from the opaque slide member 7 which is to be scribed upon, which operation will be more fully described. This detached position which is shown most clearly in FIGURES 2, 3 and 4 enables the annular slide 71 (see FIGURE 2) to be rotated to its next scribing position free of any engagement with scribing stylus 103.

A solenoid 96, which is controlled in a manner to be more fully described, operates frame 91 between the detached position shown in FIGURE 3 and the scribe position (not shown) under control of the appropriate electrical signal. The solenoid plunger (not shown) is coupled to a shaft 93*a* which extends the vertical height of inner frame 35 and which is securely fastened at its upper end to a solenoid lever 97 which rotates with shaft 93*a* as its pivot under control of the solenoid plunger.

The movement of the scribing stylus 103 from the detached position to the scribing position is as follows:

Upon energization of solenoid 96, solenoid lever rotates clockwise about shaft 93*a* as shown by arrow 120 causing the free end of solenoid lever 97 to abut against the top portion of frame 91. The force exerted by solenoid lever 97 to abut against the top portion of frame 91. The force exerted by solenoid lever 97 is sufficient to overcome the holding force of spring 98 and hinge spring 93 (see FIGURE 16) so as to cause frame 91 to experience rotation about hinge spring 93. The upper portion of frame 91 is driven away from the adjacent face of inner frame 35. As previously described, scribing stylus 103 is approximately 8 to 15 thousandths of an inch away from the surface of the opaque slide 71 (see FIGURE 2) so that the D.C. solenoid 96 displaces frame 91 this distance in order to bring scribing stylus 103 into contact with the opaque surface of slide 71 while frame 91 continues rotating about hinge spring 93 until the top of frame 91 engages a stop which is attached to inner frame 35. This stop (not shown) is adjusted so that the deflection of glass plates 101 and 102 results in the desired stylus pressure. Thus, the large force resulting from the large moving mass of frame 91 and of solenoid 96 is absorbed by the stop mounted on frame 35 and is, therefore, separated from the impact force acting on the stylus point which is the result of only the light mass of the stylus itself and that part of the thin flexing glass plates 101 and 102 which moves with the stylus. Upon deenergization of D.C. solenoid 96 the spring constant of hinge spring 93 and spring 98 urge frame 91 back into engagement with the adjacent face of inner frame 35.

Another preferred embodiment of the scribing stylus mounting 90 is shown in FIGURES 21*a* and 21*b* wherein the glass mounting plates 101 and 102 are replaced by wire members 550, 551 which are securely fastened to the diagonal corners of the scribing stylus frame 552. The wire members 550 and 551 exhibit sufficient resiliency to absorb the impact imparted to scribing stylus 103″ upon engagement of the stylus with the opaque slide 71 and yet is sufficiently rigid to prevent any motion in the plane of the frame 552.

The wires 550*a* lie substantially in a plane and are secured to the diagonal corners of the frame 552 and are threaded through apertures 553 and 554 of stylus 103″ and fixedly secured thereto. The wires 550 and 551 may be secured to stylus 103″ in the plane of frame 552 by a soldering operation or other suitable fastening procedure.

An alternative embodiment for the crossed-wire stylus mounting of FIGURE 21 is shown in FIGURES 22–22*c*, respectively. In this embodiment the stylus frame 552, which is substantially rectangular, is provided with a first pair of crossed-wires 550*a′* and 550*b′*. Crossed-wire 550*a′* is secured to frame 552 upon its front face 552*a* and at its diagonal corners 552*c* and 552*d*, respectively. Wire 552*b′* is likewise secured to the front face 552*a* and at the diagonal corners 552*e* and 552*f* respectively.

The second pair of crossed-wires is comprised of crossed-wires 551*a′* and 551*b′*, respectively. These crossed-wires are secured to the rear face 552*b* of frame 552 and are secured at the diagonal corners thereof in substantially the same manner as crossed-wires 550*a′* and 550*b′*, respectively.

In order to provide more rigidity for stylus member 103″ and to severely limit deflection of the stylus from its longitudinal axis represented by the phantom line 560, the first and second pairs of crossed-wires are rigidly secured to one another at locations intermediate the stylus member and the ends of the wires. For example, considering crossed-wires 550*b′* and 551*b′* in the region within the dotted circle 561. It can be seen that the wires cross one another at 562. At the point 562 where this crossing occurs, the wires are rigidly joined to one another by means of a small strip of wire 563 (see FIGURE 22*d*) which is wrapped around the wires at intersection 562 to rigidly join them at this point.

As an alternative method the wires may be joined at the intersection 562 by means of soldering with the solder 564 (see FIGURE 22*c*) rigidly joining the crossed-wires at this intersection.

From a consideration of FIGURE 22, it can clearly be seen that four such intersections 562 and 565–567, are provided within the assembly. Since all of these intersections are substantially identical as to arrangement and function, only one will be described in detail, it being understood that the remaining intersections are substantially the same.

The manner in which the crossed-wires are joined to one another can best be understood from a consideration of FIGURES 22*a*–22*d*. Considering first FIGURE 22*a*, there is shown therein the wire 550*b′* from the first crossed-wire pair and the wire 551*b′* from the second crossed-wire pair. Considering first wire 550*b′*, one end thereof is coupled to the front face of frame 552 at 552*e*. The wire is then threaded through an aperture 555 provided near the rear end of stylus 103″ and then is bent back toward the front face of frame 552 with its opposite end being coupled to the front face of the frame 552*f*. Considering now wire 551*b′*, its left-hand end is coupled to the rear face of frame 552 at 552*g*. The wire is bent generally forward until it is threaded through an aperture 553 in stylus 103″. Wire 551*b′* is then bent in a generally rearwardly direction with its extreme right-hand end being secured to the rear face of frame 552 at 552*h*. It should be understood that the means for coupling wires 550*b′* and 551*b′* at the locations 552*e*–552*h*, respectively, may be any suitable fastening means such as threaded screws, for example.

By threading the wires 550*b′* and 551*b′* in the manner described above, it can clearly be seen that these wires will intersect one another at the locations 562 and 566. These wires are rigidly joined at the intersections 562 and 566 either by wrapping music wire 563 about the intersection, as shown in FIGURE 22, and then applying solder 564 at this intersection, or simply by applying solder alone.

FIGURE 22*b* shows an alternative ararngement for the threading of wires 550*b′* and 551*b′*. Considering first wire 550*b′*, its left-hand end is secured to frame 552 at 552*e*. The wire is then bent in a generally rearwardly direction until it reaches the intersection location 566. At this point it is looped behind wire 551*b′* and is bent in a generally forwardly direction until it is threaded through opening 553 in stylus 103″. Wire 550*b′* is then bent in a generally rearwardly direction until it intersects with wire 551*b′* at 562 where it is looped behind wire 551*b′*, and bent in a generally forwardly direction where its extreme right-hand end is secured to frame 552 at 552*f*. The wire 551*b′* is bent in a substantially similar manner to complement the threading of wire 550*b′* so as to form the looping intersections at 562 and 566, as can best be seen in FIGURE 22*c*. While a description of the wires 550*b′* and 551*b′* has been set forth with regard to FIGURES 22*a*–22*d*, it should be understood that the wires 550*a′* and 551*a′* are threaded in a similar manner to that shown in FIGURES 22*a*–22*d*, and a description of the threading of these wires has been omitted, for purposes of simplicity.

The reason for interconnecting the crossed-wires at the intersections 562 and 565–567 can best be understood upon a consideration of FIGURES 23*a*–24*b*. As was previously described, the stylus mounting frame 552 is controlled by solenoid means 96 for the purpose of moving the stylus into engagement with the opaque coating composition upon slide 71, as shown in FIGURES 2 and 3, in readiness for performance of the scribing operation, i.e., the performance of the operation wherein the stylus scratches away or removes the opaque coating to form a trace or curve.

FIGURE 23*a* is a cross-sectional view of the stylus mounting assembly of FIGURE 21*a* showing the assembly with the stylus being disengaged from the slide 71. In a like manner, FIGURE 24*a* is a sectional view of the stylus assembly of FIGURE 22 showing the stylus 103 being disengaged or spaced from slide member 71.

Under control of the solenoid 96 mentioned previously, the stylus assembly is moved toward the annular slide member 71, bringing the point of the stylus member into engagement with the opaque surface of the annular slide member. FIGURES 23*b* and 24*b* show the stylus mounting assemblies of FIGURES 23*a* and 24*a*, respectively, where the stylii 103 have been brought into contact with the opaque surface of the slide member 71.

Two things are evident from a consideration of FIGURES 23*b* and 24*b*. It can be seen that the rearward edge of the stylus is moved rearwardly by a distance D which is proportional to the pressure exerted by the stylus upon the surface of the annular slide member. Stylus pressure can be increased somewhat by tightening the crossed-wires at the diagonals of the frame, if desired. However, considering an equal amount of tightening for both forms of stylus assembly shown in FIGURES 23*b* and 24*b* the amount of rearward deflection will be nearly the same.

The second thing noticeable from a consideration of FIGURES 23*b* and 24*b* is that the styli are deflected at an angle $\theta$ from their respective longitudinal axes 560, with the stylus of FIGURE 23*b* experiencing a deflection angle $\theta$ and the stylus 103 of FIGURE 24*b* experiencing a deflection angle of $\theta_2$. Extensive experimentation has shown that the embodiment of FIGURE 24*b* experiences a deflection angle $\theta_2$ which is less than ⅙ that of the deflection angle $\theta_1$ experienced by the embodiment of FIGURE 23*b*. It can therefore be seen that the embodiment of FIGURE 24*b* has far greater resistance to the stylus pressure and deflecting force F than the embodiment of FIGURE 23*b*. These results have shown that, for various values of stylus pressure and various values of force F which tend to produce the lateral deflection, that the angle $\theta_2$ is less than ⅙ as large as the angle $\theta_1$ which has the beneficial effect of preventing the stylus 103 from deviating from its commanded position as a result of the mechanical deflection which it experiences.

The wires 551*a* and 551*b* lie substantially in a plane a spaced distance from the wires 550*a* and 550*b* and cooperate with apertures 555 and 556, respectively, in the same manner as wires 550*a* and 550*b*, thus serving to secure both ends of stylus 103″.

FIGURE 28*b* shows a lens 557 having an aperture 557*a* for receiving stylus 103″. The lens, which is optional, is employed for the purpose of distinguishing the traces of different projectors in a system employing a plurality of projectors such as the system shown in FIGURE 7.

TURRET WHEEL ASSEMBLY

The turret wheel assembly 70 of FIGURE 2 contained within the housing 17 of data projector 10 consists of an opaque coated annular glass ring 71 which has sufficient area along a one inch annular section to permit the scribing of 20 separate one inch by one inch areas. This slide is removably fastened to a turret 72. Shafts 76 and 77 cooperate with shaft housing 19, which is secured to projector front plate 15, for the purpose of providing a cantilevered rotatable shaft arrangement. Shaft 76 is pressure fitted within portion 19*a* of housing 19, while shaft 77 has an outer dimension which is less than the inner dimension of housing 19 so as to permit shaft 77 to rotate about shaft 76 and to be vertically positioned with respect to projector front plate 15 by means of housing portion 19*a* of housing 19.

Rotatable turret wheel 72 is urged into rotation to turret drive torquer 73 which imparts rotational movement to turret 72 by means of drive shaft 74, gear member 75 and cooperating gear member 72*a* which is secured to turret wheel 72. Torquer 73 is of the same type as torquers 36 and 47 described previously. Thus, upon appropriate energization of turret drive torquer 73, turret wheel 72 is driven either counterclockwise or clockwise to position the next one inch by one inch area to be scribed adjacent to the scribing stylus 103.

In order to insure accurate angular alignment of turret wheel 72 and likewise slide member 71 a solenoid assembly 78 is provided, which assembly has a detent for both assuring accurate angular alignment and for locking the turret wheel 72 to prevent angular movement of the turret wheel during the scribing operation. This operation is performed as follows:

Upon rotation of turret wheel 72 under control of torquer 73 and the connecting shaft and gears 74, 75 and 76, respectively, turret wheel 72 is driven to the next scribing position. A plurality of inverted key-shaped slots 79 are provided around the periphery of turret wheel 72 for engagement by detent member 81 of the solenoid assembly 78. The faces 80 of slot 79 which are adjacent the periphery of turret wheel 72 flare outwardly so as to provide a substantially wide opening for detent 81 upon movement of turret wheel 72 to the approximate angular position for the next one inch by one inch scribing area. Solenoid 78 is energized in a manner to be more fully described causing detent 81 to enter the slot 79. The detent 81 has a tapered profile which, upon substantial insertion into the slot 79, causes the sides of the tapered detent 81 to abut the flared surfaces 80 of the slot 79 thus bringing turret wheel 72 into accurate angular alignment. An electronic circuit to be more fully described multiplexes the operation of turret drive torquer 73 and solenoid 78 so that detent 81 is not seated in one of the slots 79 at the instant when turret wheel 72 is being rotated by turret drive torquer 73.

In order to provide color selection requirements for each scribing area of glass slide 71, a color wheel 82 is provided, which wheel is mounted for rotation upon turret wheel 72 and is provided with just one filter member 83. If desired, the single filter 83 may be replaced by a plurality of filters which are provided around the periphery of color wheel 82 in order to produce projections having different trace colors. The color wheel 82 of FIGURE 2, for example, may be provided with six color filters each of a different color, an opaque filter and a transparent filter represented by the areas 83*a*–83*h*, respectively. Since in this embodiment only eight lenses 83 are provided, turret drive torquer 73 may be modified to drive turret wheel 72 into only eight discrete angular positions, and likewise the number of plots 79 may be limited to 8 in such an embodiment. It should be understood, however, that the number of lenses 83 provided in the color wheel 82 may be greater or fewer than 8, depending upon the application of the individual projector. In addition, color wheel 82 may be provided with one annular filter having a configuration 83 as shown in FIGURE 2, wherein applications requiring a bank of data projectors of the nature of data projector 10 each data projector may have a different colored filter to distinguish it from the other projectors in the projector bank as opposed to having colored filters which distinguish each graph of one data projector from the other graphs of the same data projector. This function may also be provided by placing a color filter over lens assembly 14 to avoid the need for an annular shaped color filter 83 as shown in FIGURE 2.

PROJECTION SYSTEM

The projection system consists of a xenon-mercury arc lamp (or other suitable) light source 63 (see FIGURE 2), a condensing lens system 61 located within the stylus frame mechanism 62 and located behind the frame mechanism, an objective lens 14 located in front of the slide turret (see FIGURE 1) and a blower means 65. The blower means 65 cools the projector elements and provides a stream of air which circulates within the projector housing to remove the opaque coating residue produced during the scribing operation.

PROJECTOR SERVO SYSTEM

The electronics portion of the horizontal and vertical tape drive assembly is set forth in FIGURES 11, 12 and an oscillogram as shown in FIGURE 13 is provided to explain the operation thereof. The components of the servomechanism arrangement shown in FIGURES 11 and 12 are represented diagrammatically for purposes of clarity.

The input signal is a command D.C. potential wherein the magnitude of the voltage input controls the amount of deflection of the stylus and the polarity of the input voltage controls the direction of deflection of the stylus, from its rest position. The command signal is impressed upon input terminal 211 (see FIGURE 11) which is the input to the comparison circuit 201. The input command signal is compared with an output signal from potentiometer transducer 44' impressed upon input terminal 217 of error detector 201 so as to produce an error signal ($\theta_e$). The error sign ($\theta_e$) is transferred from the output 48 of comparison circuit 201 to the input of error detector circuit 202 which amplifies the output signal ($\theta_e$). The resulting D.C. error signal ($\theta_e$) is fed through a passive shaping or compensation network 203 which consists essentially of lead-lag networks, which consists of resistors and capacitors in a predetermined arrangement. The signal is then impressed upon chopper or modulator circuit 204 which chops (modulates) the signal at a 2 kilocycle rate under control of modulating source 205 which is a local oscillator. The output of chopper 204 is impressed upon the input terminal of wide band A.C. amplifier circuit 206. The amplitude of the signal impressed upon A.C. amplifier 206 is proportional to the error ($\theta_e$) and the phase (zero, 180°) is a function of the polarity of the D.C. error.

The resulting 2 kilocycle signal is then amplified in high gain A.C. amplifier 206 which maintains the phase and amplitude integrity of the input signal. The resulting output signal is demodulated in solid state demodulator circuit 207 which is keyed to the same 2 kilocycle frequency emanating from the local oscillator source 205. The resulting polarity reversing D.C. output voltage emanating from synchronous demodulator 207 is an amplified version of the D.C. signal fed into chopper means 204. The employment of the carrier system which includes the modulating and demodulating operations eliminates harmful drift characteristics which are inherent in high gain D.C. amplifiers.

Ultimate power amplification is accomplished in the solid state D.C. amplifier circuit 208. Although the drift characteristics are inherent in a D.C. amplifier of this nature, it is not critical in the circuit of FIGURE 11 because the voltage levels at the input of the D.C. amplifier 208 employed here are quite high. For example, in the preferred embodiment of FIGURE 11, the input voltage to D.C. amplifier 208 is approximately 2 volts. The two kilocycle power requirements for the chopping and demodulation operations are obtained from an oscillator of the solid state variety.

The amplifier output from D.C. power amplifier 208 is impressed upon the armature (not shown) of torquer 36' (see FIGURE 11) which is the schematic representation of torquer 36 shown in FIGURES 2 and 3. The impression of the D.C. signal upon the armature of D.C. torquer 36' causes the shaft 37 (which operatively connects D.C. torquer 36' to the stylus 103'') to rotate in order to deflect stylus 103'' to the appropirate vertical position. Shaft 36a which is fixedly secured to and which rotates concurrently with the armature (not shown) of D.C. torquer 36' and shaft 37, respectively, rotatably drives potentiometer transducer 44' which is the schematic representation of potentiometer transducer 44 shown in FIGURES 2 and 3. The rotation of transducer 44' generates a D.C. output voltage theta sub zero ($\theta_0$) at its output terminal which signal is fed back through line 212 to the input terminal 217 of comparison circuit 201.

TURRET SYNCHRO ASSEMBLY

The turret wheel 72 of FIGURE 2 is positioned by motor 73 which is identical in design to the D.C. servomotor employed in the horizontal and vertical tape drive assemblies shown in FIGURES 2 and 3. The angular position of the turret wheel 72 is sensed by a synchro means 230 (see FIGURE 19) which is operatively connected to turret wheel 72 in any well known manner. The output of synchro 230 is impressed upon a resistance delta circuit 231 in a manner such as that set forth on pages 341–343 of the McGraw-Hill publication Servo Mechanism Analysis by Thaler and Brown, copyright 1953, which discusses the preparation and application of synchro motors and generators of this general description. The output of the resistance delta circuit 231 is amplified at the amplifier 232 to present a signal to servomotor 273 of sufficient amplitude to drive turret wheel 72 through the mechanical linkage 74, 75 and 72a. The turret is accurately positioned by the detent 81 which is selectively engaged and disengaged by solenoid 78 as previously described. Since the servomotor employed to position the turret is of the same type as the torquer motors used to position the scribing stylus, this allows the electronic circuitry employed for stylus positioning functions to serve the added function of poistioning the turret wheel, as will be more fully described.

The amount of rotation experienced by the rotor (not shown) of the motor 73 is determined by the switch means 267 which is the control panel employed to select the desired angular portion of the slide 72 to be scribed. The switch means controls a variable resistive member (not shown) the impedance of which determines the amount of rotation the rotor experiences.

PROJECTOR MULTIPLEXING CIRCUIT

Figure 7:
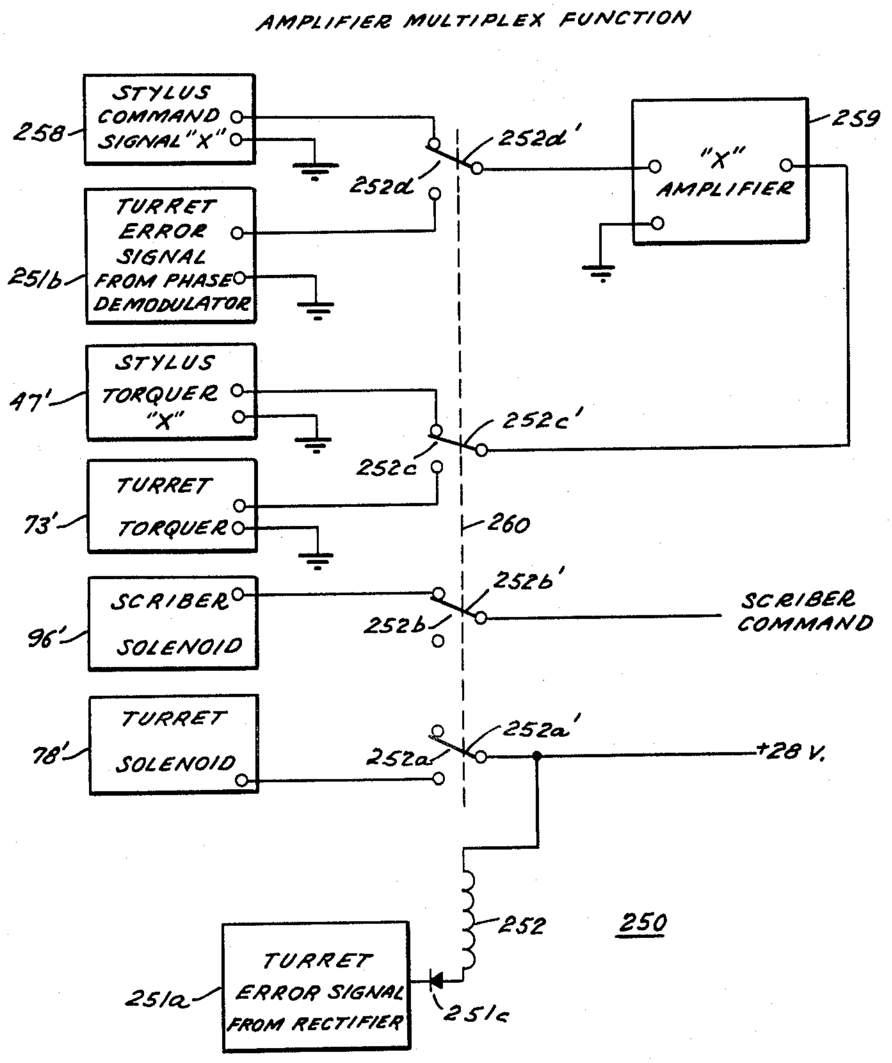
FIGURE 7 is a schematic diagram showing the manner in which the amplifier multiplexing operation is performed.

The scribing stylus need not be positioned while the turret wheel is undergoing rotation since the time necessary to position the turret is negligible and thus no significant operating time is lost during the slide changing operation. The multiplexing circuitry is shown in FIGURE 8 wherein the turret error signal from rectifier 251c which is generated by the turret error signal means 251a shown in FIGURE 8, is connected via rectifier 251c to one terminal of a relay coil 252 whose other terminal is connected to a positive voltage source such as, for example, +28 volts. The relay coil 252 operates four different pairs of two position contacts 252a–252d, respectively. The operation of the amplifier multiplexing function is as follows:

Upon the occurrence of an error signal from the generator synchro bridge 231 (FIGURE 19) the error signal represented by block 251a of FIGURE 7 is impressed through rectifier 251c upon relay coil 252 causing a voltage drop across relay coil 252. Since the error signal is negative with respect to ground potential the diode 251c conducts impressing a voltage drop across coil 252 which is sufficient to maintain the movable arms 252a'–252d' of contact pairs 252a–252d respectively, in the downward vertical position by means of mechanical linkage 260. Thus, in the downward position the turret error signal from the phase demodulator which is represented by block 251b is amplified through the horizontal driver 25a and drives turret torquer 73' which is equivalent to the D.C. torquer 73 shown in FIGURES 2 and 3. At this instant, the scriber command signal is disconnected from the "*x*" amplifier 259 due to the position of movable arm 252d'. The scriber solenoid represented by block 96' which is the schematic representation of the solenoid 96 shown in FIGURES 2 and 3 is likewise disconnected. The turret solenoid which is represented schematically by block 78' is connected to the 28 volt source due to the downward positioning of movable arm 252a' causing the detent 81 (see FIGURE 2) to be disengaged from the adjacent notch 79 during the slide rotating operation. The turret torquer 73' which is connected to "*x*" amplifier 259 due to the positioning of movable arms 252c receives the output signal therefrom and consequently positions the turret accordingly.

Upon the occurrence of zero error signal which signified the fact that the turret 72 (see FIGURE 2) is appropriately aligned angularly, the voltage drop across relay coil 252 is insufficient to retain the movable arms 252a' through 252d' in the downward position. This impresses the input from the stylus command signal "*x*" 258 upon the "*x*" amplifier 259, the output of which is connected to the stylus torquer, which is represented schematically by block 47', in order to position scribing stylus 103 (see FIGURE 2) horizontal or "*x*" position. The phase demodulator 251b which is connected to the output of the synchro generator 230 (see FIGURE 19) is employed to transform the output of the synchro generator into a D.C. voltage so that the appropriate input may be impressed upon "x" amplifier 259.

The movable arm 252b' being in its upward vertical position energizes scriber solenoid 96' causing the scribing stylus 103 (see FIGURE 4) to make contact with the opaque slide 71 as previously described so as to permit scribing of the slide 71 while the slide is locked from rotation by means of detent 81. The movable arm 252a being in its upper vertical position disconnects the D.C. source from current solenoid 78' to insure that detent 81 remains in engagement with the notch 79 so that the angular movement of turret wheel 72 will not be permitted.

TURRET POSITIONING MEANS

The electrical circuitry 260 employed in positioning the turret wheel 72 is shown in FIGURE 8. The selector circuitry 260 is comprised of a plurality of movable arms 261–266 which are operable by push-buttons (not shown) located at the data projector console for manually controlling the angular positioning of the turret wheel. Each movable arm 261–266 is connected by means of a common conductor 274 to a voltage source E+. The opposite ends of movable arms 261–266 are engageable with stationary terminals 261a–266a depending upon which pushbutton is depressed at any given instant. Each stationary contact 261a–266a is connected by conductor means to an associated terminal 261b–266b for selective engagement with the rotary arm 267 of a stepping switch. The opposite end of stepping switch rotary arm 260a is conected by conductor 268 to movable arm 269 which is engageable with a stationary contact 270 connected by conductor 272 to relay winding 271, the opposite terminal of which is connected to ground potential 273. Although the turret selector circuitry 260 of FIGURE 8 shows only 6 movable arms 261–266 it should be understood that a greater number of movable arms operated by push-buttons may be employed in order to control the turret wheel to assume as many as 20 different angular positions, for example.

The operation of turret selector circuitry 260 is as follows:

The push-buttons (not shown) which control the associated movable arms 261–266 are operatively connected to a mechanical linkage represented schematically by dotted line 275 to prevent more than one push-button to be depressed at any given instant. Assuming that the initial condition of turret selector circuitry 260 is such that the first movable arm 261 is in the position shown by the solid line representation 261', the mechanical linkage 275 prevents the movable arms 262–266 from moving from the position shown in FIGURE 8 to the depressed position. At this instant the E+ voltage source is not connected to the relay coil 271 even though the movable arm of the stepping switch is in the position shown by the solid line 267. Assuming now that the pushbutton associated with movable arm 262 operates this arm to the dashed line position 262', the mechanical linkage 275 causes the movable arm of the first position to move from the position shown by solid line 261' to the position shown by dotted line 261. In this position a current path exists from the E+ voltage source through common line 274, movable arm 261, stationary contact 261a, stepping switch arm 260a, conductor 268, movable arm 269, stationary contact 270, lead 272 through relay coil 271 to ground potential 273. The energization of relay coil 271 causes movable arm 260a and movable arm 269 to move respectively to the positions shown by dotted line 260a' and dotted line 269'. The purpose of movable arm 269 and associated contact 270 is to cause stepping switch 267 to step only one position at a time since the separation of movable arm 269 with stationary contact 270 causes deenergization of relay coil 271. After a predetermined time delay, movable arm 269' moves back to the position shown by solid line 269 causing re-engagement with stationary contact 270. However, since the second pushbutton has been depressed, movable arm 262 is now in the position shown by dotted line 262' thus, disconnecting the E+ voltage source from relay coil 271. Thus, although the movable arm 269 has returned from the position shown by dotted line 269' to the solid line position, the stepping arm 267 which is now in the position shown by dotted line 267' is prevented from stepping any further in the clockwise direction. The stepping switch 260a is connected to the resistance delta circuit 260b (see also FIGURE 19) which, in turn, connects the appropriate voltage to amplifier 232 which impresses its output on D.C. torquer 73 in order to appropriately position turret wheel 72. The scriber solenoid 96 (see FIGURES 2 and 3) is not operable in this relay position which insures against an accidental scribing operation. The turret control circuitry is similar on projectors with color discs. However, it allows for only 8 positions and multiplexes the vertical or "y" amplifier function between scribing and color disc positioning in the same manner as described above with respect to the multiplexing of "x" or horizontal input and the turret positioning input signals.

The rotary arm 260a is coupled to rotary arm 260b of delta network 231 by mechanical linkage 260c. Arm 260b thereby rotates in unison with arm 260a so as to selectively engage the taps 261c–266c of multitap resistance 291. The resistance 291 is connected across the windings 292 and 293 of Y-windings 231 to regulate the total impendance thereof. Leads to 297 and 298 provide a current path from servo amplifier 232 input terminals to arm 260b, resistance 291, lead 299a and windings 293 and 294.

Rotatable winding 296 which is energized by A.C. source 296a generates a magnetic field which generates an E.M.F. in each winding 292–294. The magnitude of the E.M.F. is regulated by the resistance 291. The resultant E.M.F. is amplified by amplifier 232 to energize turret motor 73. In addition to being mechanically linked to the turret (see FIGURE 19) motor 73 is coupled to winding 296 by mechanical linkage 295 causing winding 296 to rotate in either the clockwise or counterclockwise direction to reduce the resultant E.M.F. developed by windings 292–294 to zero when turret 72 (see FIGURE 19) is in proper alignment.

PROJECTOR LENS ASSEMBLIES

The distortion creates a trapezoidal effect due to the oblique projection which produces unequal magnification and unequal sharpness of focus at the center and at the corner of a projected image. In FIGURE 14 a projector which is shown schematically as being comprised of merely the projector lens 420 is tilted at an angle theta ($\theta$) to the screen such that the original image 421 appears as a trapezoidal image 422 upon the screen 411. As can be seen from the geometric figure 422, it is apparent that the magnification at the bottom of the figure corresponding to the side d.c. will be greater than the magnification of the top side b.a. by a factor equal to the ratio $d2$ divided by $d1$ ($d2/d1$). A good approximation for the trapezoidal distortion ratio is derived as follows:

$$\frac{d'c'}{b'a'}=\frac{d_2}{a_1}=\frac{K \text{ sec. } (\alpha+\theta)}{K \text{ sec. } (\alpha-\theta)}=\frac{\cos (\alpha-\theta)}{\cos (\alpha+\theta)}$$

where $\alpha$=the total angular field and $\theta$=the angular tilt of the projector. To take a specific example, assume:

$$\alpha=\arctan \frac{0.5}{2}=0.25=14° \text{ and } \theta=5°$$

the trapezoidal distortion ratio then becomes:

$$\frac{d_2}{d_1}=\frac{\cos 9°}{\cos 19°}=\frac{.09877}{.09455}=1.045$$

This means that the side $d'c'$ will be about 4½% larger than the side $a'b'$. The trapezoidal distortion may be eliminated by employing a variable gain potentiometer control in the torque motors 47 and 36 of any given projector which potentiometers will be a linear function to compensate for the trapezoidal distortion ratio which is likewise a linear function of the tilt angle so as to eliminate the appearance of distortion whatsoever. The same scheme is employed for correcting trapezoidal effects when the lens is displaced in the "x"–"y" plane so that the same circuitry is used for both corrective actions wherein each has as its input the displacement distances from the "x"–"z" and "x"–"y," respectively.

Since given lens assemblies presently in use have focal lengths which vary by as much as ±2% causing the lenses of a bank of projectors such as those shown in FIGURE 7 to be unmatched, this may be corrected electronically by varying the "x" and "y" constants via the scriber follow-up potentiometers, in order to equalize all final image sizes. It has been discovered that the employment of lenses of the Biotar type having highly corrected systems of F2.8 aperture or better and possessing a minimum of radio distortion consistent with the angular field coverage required were found to have less than ½ of 1% radial distortion which is well within the desired limits. The light source employed achieved approximately 1000 lumens output toward the screen which assures adequate image brightness for all conceivable purposes even with the use of the filters 83 shown in FIGURE 2.

A typical data projector problem is illustrated in FIGURE 15 which shows the screen 301 having a four-line trace consisting of the straight lines A, B, C, and D having arrows showing the direction of development of the traces which are portrayed on the screen 411. The following table is the analysis of the time cycle of the stylus through each of the excursions A through D:

| Command Operation | Track | Detail Time | Total Time, secs. max. |
|---|---|---|---|
| 1 | A | Digital to analog conversion 0.001 secs. Stylus (command) 0.020 secs. Servo response and time to complete the 1.414" travel 0.350 secs. | 0.371 |
| 2 | B | D-A conversion 0.001 secs. Stylus down 0.020 secs. Servo response 0.090 secs. | 0.111 |
| 3 | C | D-A conversion 0.001 secs. Stylus up 0.020 secs. Servo response 0.175 secs. | 0.196 |
| 4 | D | D-A conversion 0.001 secs. Stylus down 0.020 secs. Servo response 0.135 secs. | 0.156 |

Total time for entire problem: 0.834 seconds maximum.

It can be seen that with my novel direct drive arrangement that swift response capabilities are derived from the system regardless of the complexity of the plotting problem involved.

PROJECTOR COATING COMPOSITION

The slide coating composition of the annular slide 71 as shown in FIGURE 20, which is a cross-section of the opaque slide, consists of a glass layer 403 having a primary coating of lead, indium or equivalent impressed thereon. The primary coating 402 has the characteristics of low melting point, spreading quite uniformly during the depositing operation and a low degree of ionization. The thickness of the primary coating 402 is on the order of wave lengths and is approximately 10% of the total thickness T of the entire coating arrangement. The coating primary 402 of the desired thickness has a relatively high percentage of light transmission. The secondary coating 401 which may be a coating of aluminum or equivalent is employed to provide the necessary feature of opaqueness due to the relatively high light transmission characteristic of the primary coating 402. It was found that use of the secondary coating alone required substantially more scribing power than the primary-secondary coatings of the instant invention. It has been found that metals such as aluminum, molybdenum, and silver, for example, may be substituted in place of aluminum as long as the metals used have a high degree of purity. It has been found that during the scribing operating the undercoating 402 acts as a lubricant beneath the secondary coating 401 so that the removal or scribing operation of these coatings is substantially smoother than the scribing of the secondary coating in the absence of the primary coating as described above. A single aluminum layer of the secondary coating has the disadvantage of producing a jagged line during the scribing operation giving a "snow plow" effect whereas the employment of the primary coating beneath the secondary coating obviates these disadvantages. The thickness of the secondary coating is of the order of 80% of the total thickness T of the coating arrangement impressed upon the substrate 403.

A third coating or layer 400 may consist of a magnesium fluoride or equivalent composition. This layer has the characteristic of being extremely thin and having a high degree of toughness. The toughness however, is insufficient to impair the scribing operation. This coating acts as a protective means to prevent chemical reactions to take place with the primary and secondary layers. The third coating has a thickness of the order of 5% of the total thickness T of the entire coating arrangement. Although the third layer provides protection against any chemical reactions, it has been found that desirable results have been procured in the absence of the third coating and the choice of the presence or absence of this layer depends strictly upon the needs of the user. It has been found that this process of slide coating provides a better composition; line resolution, less stylus wear; complete freedom from skipping and line uniformity when scribed.

In order to better appreciate the manner in which the invention of the instant application fits into a complete data projector system, reference should be made to Patent No. 3,151,927, issued Oct. 6, 1964 to Walter Angst et al., entitled Projected Tracking Display and assigned to the assignee of the instant invention. The above mentioned patent contains detailed descriptions of the other subassemblies and components employed in the overall data projector system and is hereby incorporated herein by reference thereto.

Although we have described preferred embodiments of our novel invention, many variations and modifications will now be obvious to those skilled in the art, and we prefer therefore to be limited not by the specific disclosure herein but only by the appended claims.

What is claimed is:

1. A data projector comprising a substantially transparent slide member having an opaque coating means, a scribing stylus for etching said coating composition, a resiliently mounted frame assembly, comprising a frame member; first and second substantially rectangular transparent planar members, said frame member including mounting members for fixedly securing said transparent planar members to said frame, said transparent members being positioned substantially in spaced parallel fashion, said scribing stylus first and second ends being fixedly secured to said first and second transparent planar members respectively, said scribing stylus being centrally located with respect to said first and second transparent members and having its longitudinal axis substantially perpendicular to the planes of said first and second transparent members.

2. The device of claim 1 wherein said transparent planar members are made of glass.

3. The device of claim 1 with said first and second transparent members being relatively thin to provide sufficient resiliency to absorb the impact occurring when said scribing stylus engages said slide member.

4. The device of claim 3 with said transparent members being sufficiently rigid, however, to prevent movement of said scribing stylus in a plane parallel to said transparent planar members.

5. A data projector comprising a slide member having an opaque coating means, a scribing stylus for etching said coating means, a resiliently mounted frame assembly comprising a frame member, first and second wire members, said stylus having first and second apertures adjacent the scribing end of said stylus, said apertures being perpendicular to the stylus longitudinal axis and being positioned with respect to one another so that the longitudinal axis of said first aperture describes a line which is transverse to the longitudinal axis of said second aperture; said first wire member being threaded through said first aperture and having its ends secured to said frame; said second wire being threaded through said second aperture and having its ends secured to said frame; said first and second wires being substantially straight and being transverse to one another.

6. A data projector comprising a slide member having an opaque coating means, a scribing stylus for etching said coating means, a resiliently mounted frame assembly comprising a frame member, first and second wire members, said stylus having first and second apertures adjacent the scribing end of said stylus, said apertures being perpendicular to the stylus longitudinal axis and being positioned with respect to one another so that the longitudinal axis of said first aperture describes a line which is transverse to the longitudinal axis of said second aperture, said first and second wires being threaded through said first and second apertures, respectively, the ends of said first and second wires being fixedly secured to said frame member, said first and second wires being diagonally positioned with respect to said frame member and being transverse to one another.

7. A data projector comprising a slide member having an opaque coating means, a scribing stylus for etching said coating means, a resiliently mounted frame assembly comprising a frame member, first and second wire members, said stylus having first and second apertures adjacent the scribing end of said stylus, said apertures being perpendicular to the stylus longitudinal axis and being positioned with respect to one another so that the longitudinal axis of said first aperture describes a line which is transverse to the longitudinal axis of said second aperture, said first and second wires being threaded through said first and second apertures, respectively, the ends of said first and second wires being fixedly secured to said frame member, said first and second wires being diagonally positioned with respect to said frame member and being transverse to one another, third and fourth wire members, said stylus having third and fourth apertures at the end of said stylus opposite said scribing end, said apertures being perpendicular to the stylus longitudinal axis; said third and fourth apertures being positioned so that their longitudinal axes are transverse to one another; said third and fourth wires being threaded through said third and fourth apertures, respectively, the ends of said third and fourth wires being fixedly secured to said frame member, said third and fourth wires being diagonally positioned with respect to said frame member and being transverse to one another.

8. A data projector for projecting a trace upon any suitable screen comprising a substantially transparent slide member having an opaque coating composition; a scribing stylus member having a first end for etching said coating means; a movably mounted frame assembly comprising a frame member having an opening; a first two-dimensional structure lying substantially within a first plane and connected between said stylus member and said frame member and being secured to said stylus member adjacent said first end; a second two-dimensional structure lying substantially within a second plane and being arranged substantially in spaced parallel relationship with said first plane; said second two-dimensional structure being connected between said frame member and a second end of said stylus member; said first and second two-dimensional structures resiliently mounting said stylus member to said frame member and within said opening and enabling substantially all of the light of the data projector directed toward said opening to pass through said opening while providing suitable support for said stylus.

9. The device of claim 8 wherein said stylus member is positioned substantially at the center of said frame opening.

10. A data projector comprising a slide member having an opaque coating means, a scribing stylus for etching said coating means, a resiliently mounted frame assembly comprising a frame member, first and second wire members, said stylus having first and second apertures adjacent the scribing end of said stylus, said apertures being perpendicular to the stylus longitudinal axis and being positioned with respect to one another so that the longitudinal axis of said first aperture describes a line which is transverse to the longitudinal axis of said second aperture, said first and second wires being threaded through said first and second apertures, respectively, the ends of said first and second wires being fixedly secured to said frame member, said first and second wires being diagonally positioned with respect to said frame member and being transverse to one another, third and fourth wire members, said stylus having third and fourth apertures at the end of said stylus opposite said scribing end, said apertures being perpendicular to the stylus longitudinal axis; said third and fourth apertures being positioned so that their longitudinal axes are transverse to one another; said third and fourth wires being threaded through said third and fourth apertures, respectively, the ends of said third and fourth wires being fixedly secured to said frame member, said third and fourth wires being diagonally positioned with respect to said frame member and being transverse to one another, said first and third wire members and said second and fourth members, respectively, arranged in spaced parallel fashion; said first and third wire members being secured to one another on opposite sides of said stylus, and said second and fourth wire members being secured to one another on opposite sides of said stylus to reduce the deflection of said stylus during engagement with the slide member.

11. A data projector comprising a slide member having an opaque coating means, a scribing stylus for etching said coating means, a resiliently mounted frame assembly comprising a frame member, first and second wire members, said stylus having first and second apertures adjacent the scribing end of said stylus, said apertures being perpendicular to the stylus longitudinal axis and being positioned with respect to one another so that the longitudinal axis of said first aperture describes a line which is transverse to the longitudinal axis of said second aperture, said first and second wires being threaded through said first and second apertures, respectively, the ends of said first and second wires being fixedly secured to said frame member, said first and second wires being diagonally positioned with respect to said frame member and being transverse to one another, third and fourth wire members, said stylus having third and fourth apertures at the end of said stylus opposite said scribing end, said apertures being perpendicular to the stylus longitudinal axis; said third and fourth apertures being positioned so that their longitudinal axes are transverse to one another; said third and fourth wires being threaded through said third and fourth apertures, respectively, the ends of said third and fourth wires being fixedly secured to said frame member, said third and fourth wires being diagonally positioned with respect to said frame member and being transverse to one another; said first and third wire members and said second and fourth wire members, respectively, arranged in spaced parrallel fashion; said first and third wire members being looped around one another on opposite sides of said stylus, and said second and fourth wire members being looped around one another on opposite sides of said stylus to reduce the deflection of said stylus during engagement with the slide member.

12. The device of claim 10 wherein said first and third wire members and said second and fourth wire members are each secured to one another at two distinct locations on opposite sides of said stylus by four small lengths of wire twisted about said first and third and said second and fourth wire members at said distinct locations.

13. The device of claim 10 further including solder means for securing said first and third and said second and fourth wire members to one another.

14. The device of claim 12 further including solder means for securing said first and third and said second and fourth wire members to one another.

References Cited by the Examiner

UNITED STATES PATENTS

| | | | |
|---|---|---|---|
| 2,859,659 | 11/1958 | Fenske et al. | 346—112 X |
| 3,151,927 | 10/1964 | Angst et al. | 346—112 X |
| 3,160,462 | 12/1964 | Angst et al. | 346—29 |

LEO SMILOW, *Primary Examiner.*